(12) United States Patent
Chosogabe et al.

(10) Patent No.: US 8,303,408 B2
(45) Date of Patent: Nov. 6, 2012

(54) GAME DEVICE, METHOD OF CONTROLLING GAME DEVICE, AND INFORMATION RECORDING MEDIUM

(75) Inventors: Akiyoshi Chosogabe, Minato-ku (JP); Takayoshi Fukano, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 702 days.

(21) Appl. No.: 12/519,464

(22) PCT Filed: Nov. 26, 2007

(86) PCT No.: PCT/JP2007/072767
§ 371 (c)(1),
(2), (4) Date: Jun. 16, 2009

(87) PCT Pub. No.: WO2008/078489
PCT Pub. Date: Jul. 3, 2008

(65) Prior Publication Data
US 2010/0113147 A1    May 6, 2010

(30) Foreign Application Priority Data

Dec. 22, 2006  (JP) ................................. 2006-346764

(51) Int. Cl.
*A63F 13/00* (2006.01)
*A63F 9/24* (2006.01)
(52) U.S. Cl. .................. 463/31; 463/30; 463/36; 463/37
(58) Field of Classification Search .............. 463/30–31, 463/36–37
See application file for complete search history.

(56) References Cited

U.S. PATENT DOCUMENTS 5,572,251 A    11/1996   Ogawa
(Continued)

FOREIGN PATENT DOCUMENTS
EP             1076356 A2    2/2001
(Continued)

OTHER PUBLICATIONS

Kazutomo Fukuda et al., "Visual Pasokon Tsushin 'Fujitsu Habitat' ni Okeru Online Shori Gijutsu", Sep. 10, 1992, pp. 639-646, vol. 43, No. 6.

(Continued)

*Primary Examiner* — Dmitry Suhol
*Assistant Examiner* — Ryan Hsu
(74) *Attorney, Agent, or Firm* — Sughrue Mion, PLLC

(57) ABSTRACT

Provided is a game device which allows a user to designate even a position within a region that is not being displayed on a game screen within a game space as an action target position for a game character. If it is judged that a screen coordinate value according to a user's operation obtained by a screen coordinate value acquisition unit (80) is a screen coordinate value outside the game screen, a second action target position acquisition unit (86) acquires a position outside a display subject region on the game screen within a game space as the action target position for the game character. The second action target position acquisition unit (86) stores a condition related to the screen coordinate value in association with each of a plurality of action target position candidates set outside the display subject region within the game space. The second action target position acquisition unit (86) acquires an action target position candidate associated with the condition satisfied by the screen coordinate value acquired by the screen coordinate value acquisition unit (80), as the action target position for the game character.

10 Claims, 18 Drawing Sheets

U.S. PATENT DOCUMENTS

| | | | |
|---|---|---|---|
| 6,196,919 B1* | 3/2001 | Okubo | 463/32 |
| 6,347,993 B1* | 2/2002 | Kondo et al. | 463/1 |
| 6,606,104 B1* | 8/2003 | Kondo et al. | 715/764 |
| 7,084,888 B2* | 8/2006 | Takahama et al. | 345/649 |
| 7,322,889 B2* | 1/2008 | Ueshima | 463/34 |
| 7,399,224 B2* | 7/2008 | Hirai | 463/4 |
| 7,683,883 B2* | 3/2010 | Touma et al. | 345/163 |
| 7,762,893 B2* | 7/2010 | Kando et al. | 463/37 |
| 2005/0068313 A1 | 3/2005 | Morimitsu et al. | |
| 2006/0040740 A1 | 2/2006 | DiDato | |
| 2006/0094503 A1* | 5/2006 | Ajioka et al. | 463/32 |
| 2006/0258455 A1 | 11/2006 | Kando | |
| 2007/0265088 A1 | 11/2007 | Nakada et al. | |
| 2008/0085767 A1* | 4/2008 | Takatsuka | 463/32 |

FOREIGN PATENT DOCUMENTS

| | | |
|---|---|---|
| EP | 1550490 A1 | 7/2005 |
| JP | 07-178246 A | 7/1995 |
| JP | 07-244556 A | 9/1995 |
| JP | 10-333834 A | 12/1998 |
| JP | 2000-099225 A | 4/2000 |
| JP | 3262677 B2 | 3/2002 |
| JP | 2005-21458 A | 1/2005 |
| JP | 2006-314536 A | 11/2006 |
| TW | 478973 B | 3/2002 |
| TW | I258381 B | 7/2006 |
| WO | 02/057894 A2 | 7/2002 |

OTHER PUBLICATIONS

English translation of International Preliminary Report on Patentability and Written Opinion, dated Jul. 2, 2009, issued in corresponding International Application No. PCT/JP2007/072767, 8 pages.

Search Report corresponding to Taiwanese Patent Application No. 96147836, dated Dec. 22, 2010.

European Search Report corresponding to European Patent Application No. 07832492.8, dated Nov. 30, 2009.

* cited by examiner

50 : VIRTUAL THREE-DIMENSIONAL SPACE

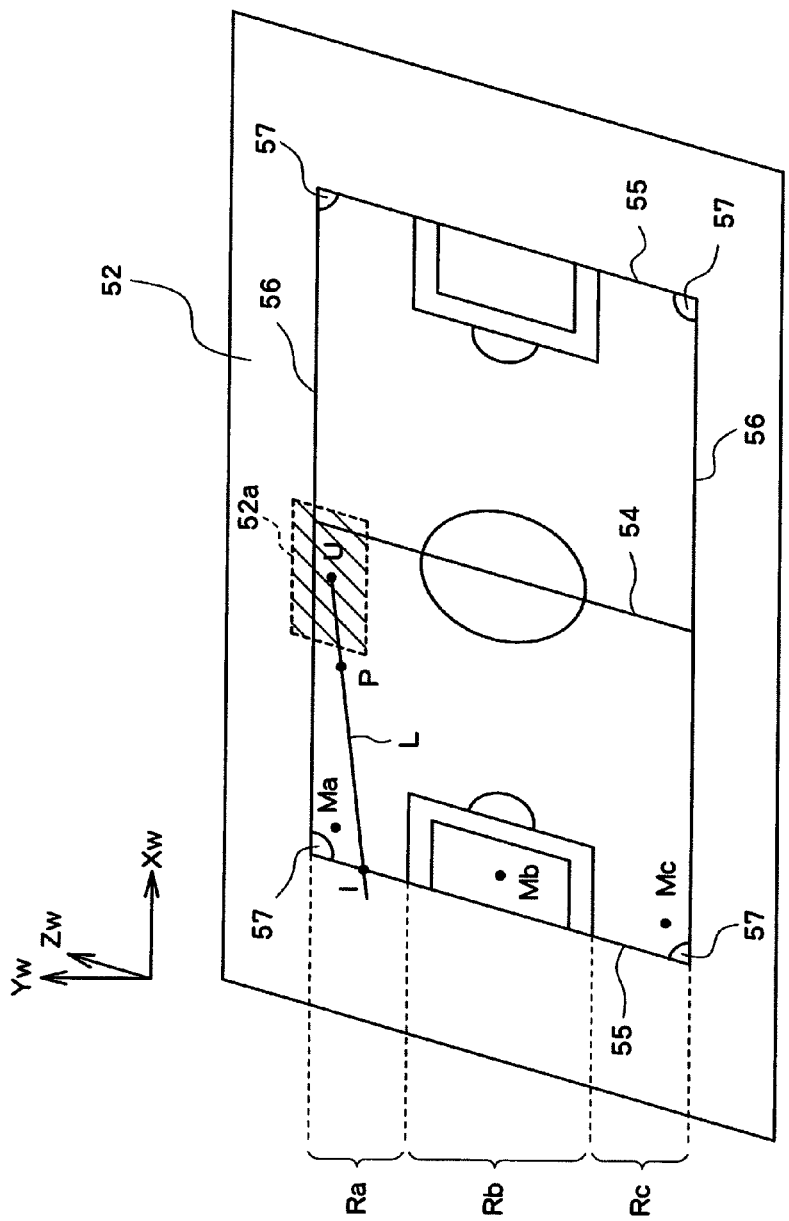

| PLAYER OBJECT ID | POSITION | MOTION DATA DURING REPRODUCTION |
|---|---|---|
| P 0 1 | ... | ... |
| ... | ... | ... |
| P 1 1 | ... | ... |

| MOTION DATA REPRODUCING POSITION | MOVING DIRECTION | MOVING SPEED |
|---|---|---|
| ... | ... | ... |
| ... | ... | ... |
| ... | ... | ... |

| BALL KEEPING FLAG | OPERATION SUBJECT FLAG | MOVEMENT TARGET POSITION | POST-ARRIVAL ACTION |
|---|---|---|---|
| ... | ... | ... | ... |
| ... | ... | ... | ... |
| ... | ... | ... | ... |

GAME DEVICE, METHOD OF CONTROLLING GAME DEVICE, AND INFORMATION RECORDING MEDIUM

TECHNICAL FIELD

The present invention relates to a game device, a game device control method, and an information recording medium.

BACKGROUND ART

There is proposed a game device in which a screen coordinate value (coordinate value in a screen coordinate system) is acquired according to a user's operation to advance a game based on the screen coordinate value. For example, there is proposed a game device in which a game is advanced based on a screen coordinate value input by using such a pointing device as disclosed in Patent Document 1.
Patent Document 1: JP 3262677 B

DISCLOSURE OF THE INVENTION

Problem to be Solved by the Invention

On such a game device, it is possible to realize, for example, such a game as to allow a user to designate an action target position of a game character by using the above-mentioned pointing device to point to a position within a game screen showing a state of a partial region of a game space. To be more specific, for example, it is possible to realize such a soccer game as to allow the user to designate a movement target position or a pass target position for a player character by using the above-mentioned pointing device to point at a position within a game screen. To realize such a game, it is necessary to allow the user to designate even a position within a region that is not being displayed on the game screen within the game space as the action target position for the game character.

The present invention has been made in view of the above-mentioned problem, and therefore an object thereof is to provide a game device, a game device control method, and an information recording medium, which are capable of allowing a user to designate even a position within a region that is not being displayed on a game screen within a game space as the action target position for the game character.

Means for Solving the Problem

In order to solve the above-mentioned problem, a game device according to the present invention, which displays on a game screen a state of a display subject region within a game space in which a game character is located, includes: screen coordinate value acquisition means for acquiring a screen coordinate value according to a user's operation; judgment means for judging whether or not the screen coordinate value acquired by the screen coordinate value acquisition means is a screen coordinate value within the game screen; first action target position acquisition means for acquiring, if it is judged that the screen coordinate value acquired by the screen coordinate value acquisition means is a screen coordinate value within the game screen, a position within the display subject region corresponding to the screen coordinate value acquired by the screen coordinate value acquisition means as an action target position of a predetermined action for the game character; second action target position acquisition means for acquiring, if it is judged that the screen coordinate value acquired by the screen coordinate value acquisition means is not a screen coordinate value within the game screen, a position outside the display subject region as the action target position of the predetermined action for the game character based on the screen coordinate value acquired by the screen coordinate value acquisition means; and game character action control means for performing action control on the game character based on the action target position acquired by the first or second action target position acquisition means, and the second action target position acquisition means includes: means for storing a screen coordinate value condition related to the screen coordinate value in association with each of a plurality of action target position candidates set outside the display subject region; means for judging whether or not the screen coordinate value condition associated with each of the plurality of action target position candidates is satisfied by the screen coordinate value acquired by the screen coordinate value acquisition means; and means for acquiring the action target position candidate associated with the screen coordinate value condition satisfied by the screen coordinate value acquired by the screen coordinate value acquisition means, as the action target position of the predetermined action for the game character.

Further, according to the present invention, a control method for a game device which displays on a game screen a state of a display subject region within a game space in which a game character is located, includes: a screen coordinate value acquisition step of acquiring a screen coordinate value according to a user's operation; a judgment step of judging whether or not the screen coordinate value acquired in the screen coordinate value acquisition step is a screen coordinate value within the game screen; a first action target position acquisition step of acquiring, if it is judged that the screen coordinate value acquired in the screen coordinate value acquisition step is a screen coordinate value within the game screen, a position within the display subject region corresponding to the screen coordinate value acquired in the screen coordinate value acquisition step as an action target position of a predetermined action for the game character; a second action target position acquisition step of acquiring, if it is judged that the screen coordinate value acquired in the screen coordinate value acquisition step is not a screen coordinate value within the game screen, a position outside the display subject region as the action target position of the predetermined action for the game character based on the screen coordinate value acquired in the screen coordinate value acquisition step; and a game character action control step of performing action control on the game character based on the action target position acquired in the first or second action target position acquisition step, and the second action target position acquisition step includes: a step of judging whether or not a screen coordinate value condition related to the screen coordinate value, stored in association with each of a plurality of action target position candidates set outside the display subject region in means for storing the screen coordinate value condition in association with each of the plurality of action target position candidates, is satisfied by the screen coordinate value acquired in the screen coordinate value acquisition step; and a step of acquiring an action target position candidate associated with the screen coordinate value condition satisfied by the screen coordinate value acquired in the screen coordinate value acquisition step, as the action target position of the predetermined action for the game character.

Further, a program according to the present invention is a program for causing a computer such as a home-use game device, a portable game device, a business-use game device, a portable phone, a personal digital assistant (PDA), and a personal computer to function as a game device which displays on a game screen a state of a display subject region within a game space in which a game character is located, the program further causing the computer to function as: screen coordinate value acquisition means for acquiring a screen coordinate value according to a user's operation; judgment means for judging whether or not the screen coordinate value acquired by the screen coordinate value acquisition means is a screen coordinate value within the game screen; first action target position acquisition means for acquiring, if it is judged that the screen coordinate value acquired by the screen coordinate value acquisition means is a screen coordinate value within the game screen, a position within the display subject region corresponding to the screen coordinate value acquired by the screen coordinate value acquisition means as an action target position of a predetermined action for the game character; second action target position acquisition means for acquiring, if it is judged that the screen coordinate value acquired by the screen coordinate value acquisition means is not a screen coordinate value within the game screen, a position outside the display subject region as the action target position of the predetermined action for the game character based on the screen coordinate value acquired by the screen coordinate value acquisition means; and game character action control means for performing action control on the game character based on the action target position acquired by the first or second action target position acquisition means, and the second action target position acquisition means includes: means for storing a screen coordinate value condition related to the screen coordinate value in association with each of a plurality of action target position candidates set outside the display subject region; means for judging whether or not the screen coordinate value condition associated with each of the plurality of action target position candidates is satisfied by the screen coordinate value acquired by the screen coordinate value acquisition means; and means for acquiring the action target position candidate associated with the screen coordinate value condition satisfied by the screen coordinate value acquired by the screen coordinate value acquisition means, as the action target position of the predetermined action for the game character.

Further, an information recording medium according to the present invention is a computer-readable information recording medium recorded with the above-mentioned program. Further, a program delivery device according to the present invention is a program delivery device including an information recording medium recorded with the above-mentioned program, for reading the above-mentioned program from the information recording medium and delivering the program. Further, a program delivery method according to the present invention is a program delivery method of reading the above-mentioned program from an information recording medium recorded with the above-mentioned program and delivering the program.

The present invention relates to the game device which displays on the game screen the state of the display subject region within the game space in which the game character is located. In the present invention, a screen coordinate value according to a user's operation is acquired. Then, it is judged whether or not the acquired screen coordinate value is a screen coordinate value within the game screen. If it is judged that the acquired screen coordinate value is a screen coordinate value within the game screen, the position within the display subject region corresponding to the acquired screen coordinate value is acquired as the action target position of the predetermined action for the game character. On the other hand, if it is judged that the acquired screen coordinate value is not a screen coordinate value within the game screen, the position outside the display subject region of the game space is acquired as the action target position of the predetermined action for the game character based on the acquired screen coordinate value. In particular, in the present invention, the screen coordinate value condition related to the screen coordinate value is stored in association with each of the plurality of the action target position candidates set outside the display subject region of the game space. Further, it is judged whether or not the above-mentioned acquired screen coordinate value satisfies the screen coordinate value condition associated with each of the plurality of action target position candidates. Then, an action target position candidate associated with the screen coordinate value satisfied by the above-mentioned acquired screen coordinate value is acquired as the action target position of the predetermined action for the game character. Then, in the present invention, the action of the game character is controlled based on the action target position thus acquired. According to the present invention, it is possible to allow the user to designate even a position within a region that is not being displayed on the game screen within the game space as the action target position for the game character.

Further, according to one aspect of the present invention, the screen coordinate value condition may be a condition related to a direction from a position of the game character within the game space toward a position within the game space corresponding to the screen coordinate value acquired by the screen coordinate value acquisition means.

Further, according to one aspect of the present invention, the second action target position acquisition means may further include: means for displaying, if it is judged that the screen coordinate value acquired by the screen coordinate value acquisition means is not a screen coordinate value within the game screen, a predetermined icon image on the game screen; and means for judging whether or not a predetermined operation has been performed by the user with the predetermined icon image being displayed on the game screen; and the second action target position acquisition means may execute, if it is judged that the predetermined operation has been performed by the user with the predetermined icon image being displayed on the game screen, the acquiring of the action target position of the predetermined action for the game character.

Further, according to one aspect of the present invention, the action target position of the predetermined action for the game character may be a movement target position for the game character. Further, the game character action control means may include: means for moving the game character to the movement target position acquired by the second action target position acquisition means; means for monitoring whether or not the game character has arrived at the movement target position acquired by the second action target position acquisition means; post-arrival action information storage means for storing post-arrival action information related to an action after the game character has arrived at the movement target position acquired by the second action target position acquisition means, in association with a position condition related to a position within the game space; post-arrival action information acquisition means for acquiring a position of the game character within the game space at a time when the action target position is acquired by the second action target position acquisition means, and acquiring the post-arrival action information associated with the position condition satisfied by the position; and means for performing action control on the game character based on the post-arrival action information acquired by the post-arrival action information acquisition means after the game character has arrived at the movement target position acquired by the second action target target position acquisition means.

BRIEF DESCRIPTION OF THE DRAWINGS

FIG. 9 is a diagram for describing a movement target position candidate.

FIG. 10 is a diagram illustrating a relationship between a movement start position and a post-arrival action.

BEST MODE FOR CARRYING OUT THE INVENTION

Hereinafter, an example of an embodiment of the present invention is described in detail with reference to the drawings.

Figure 1:
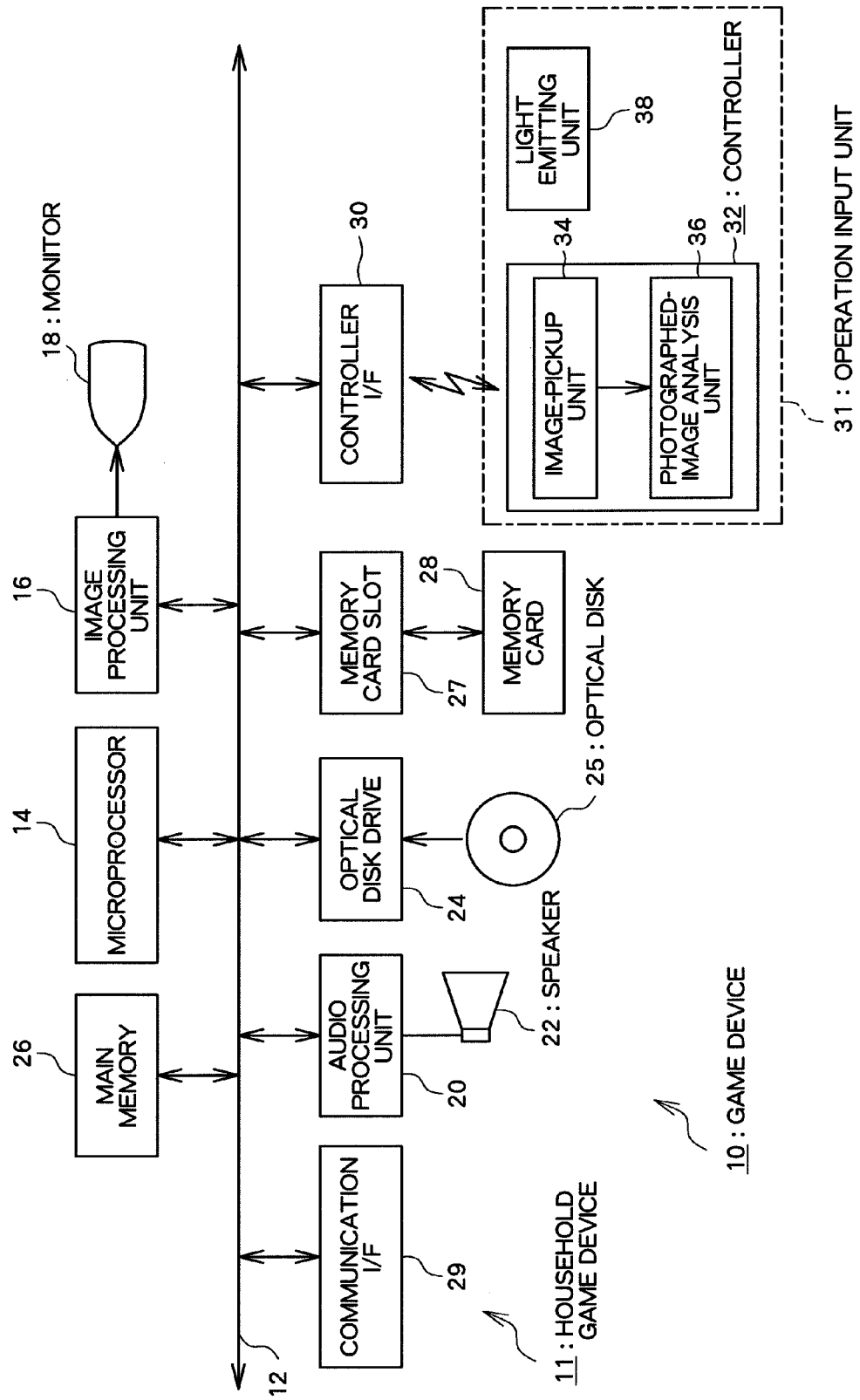
FIG. 1 is a diagram illustrating a hardware configuration of a game device according to an embodiment of the present invention.

FIG. 1 is a diagram illustrating a configuration of a game device according to the embodiment of the present invention. The game device 10 illustrated in FIG. 1 is configured by inserting an optical disk 25 and a memory card 28, which serve as information storage media, into a home-use game device 11, and also, connecting a monitor 18 and a speaker 22 to the home-use game device 11. For example, a home-use TV set is used for the monitor 18, and a built-in speaker thereof is used for the speaker 22.

The home-use game device 11 is a well-known computer game system including a bus 12, a microprocessor 14, an image processing unit 16, an audio processing unit 20, an optical disk drive 24, a memory card slot 27, a communication interface 29, a controller interface 30, and an operation input unit 31. The configurational components other than the operation input unit 31 are accommodated in an enclosure.

The bus 12 is for exchanging addresses and data among the units of the home-use game device 11. The microprocessor 14, the image processing unit 16, the audio processing unit 20, the optical disk drive 24, the main memory 26, the memory card slot 27, the communication interface 29, and the controller interface 30 are connected via the bus 12 so as to communicate data with one another.

The microprocessor 14 controls the individual units of the home-use game device 11 in accordance with an operating system stored in a ROM (not shown), a program or data read from the optical disk 25 or the memory card 28. The main memory 26 includes, for example, a RAM, and the program or data read from the optical disk 25 or the memory card 28 are written on the main memory 26 if necessary. The main memory 26 is also used for operations of the microprocessor 14.

The image processing unit 16 includes a VRAM and, based on image data sent from the microprocessor 14, renders a game screen in the VRAM. Then, the image processing unit 16 converts a content thereof into video signals and outputs the video signals to the monitor 18 at predetermined timings. The audio processing unit 20, which includes a sound buffer, reproduces various categories of sound data such as game music, game sound effects, and messages that are read from the optical disk 25 and stored in the sound buffer, and outputs the sound data from the speaker 22.

The optical disk drive 24 reads the program or data recorded on the optical disk 25 such as a CD-ROM or a DVD-ROM in accordance with an instruction given from the microprocessor 14. In this case, the optical disk 25 is employed for supplying the program or data to the home-use game device 11, but any other information storage media such as ROM cards may also be used. Further, the program or data may also be supplied to the home-use game device 11 from a remote location via a communication network such as the Internet.

The memory card slot 27 is an interface for insertion of the memory card 28. The memory card 28 includes a nonvolatile memory (for example, EEPROM). The memory card 28 is used for storing various kinds of game data such as saved data. The communication interface 29 is an interface for communicative connection to a data communication network such as the Internet.

The controller interface 30 is an interface for allowing a controller 32 to perform wireless connection. The controller interface 30 is configured so as to allow the wireless connection of a plurality of the controllers 32. As the controller interface 30, it is possible to use, for example, an interface conforming to the Bluetooth standards. Note that the controller interface 30 may be an interface for allowing the controller 32 to perform wired connection.

Figure 2:
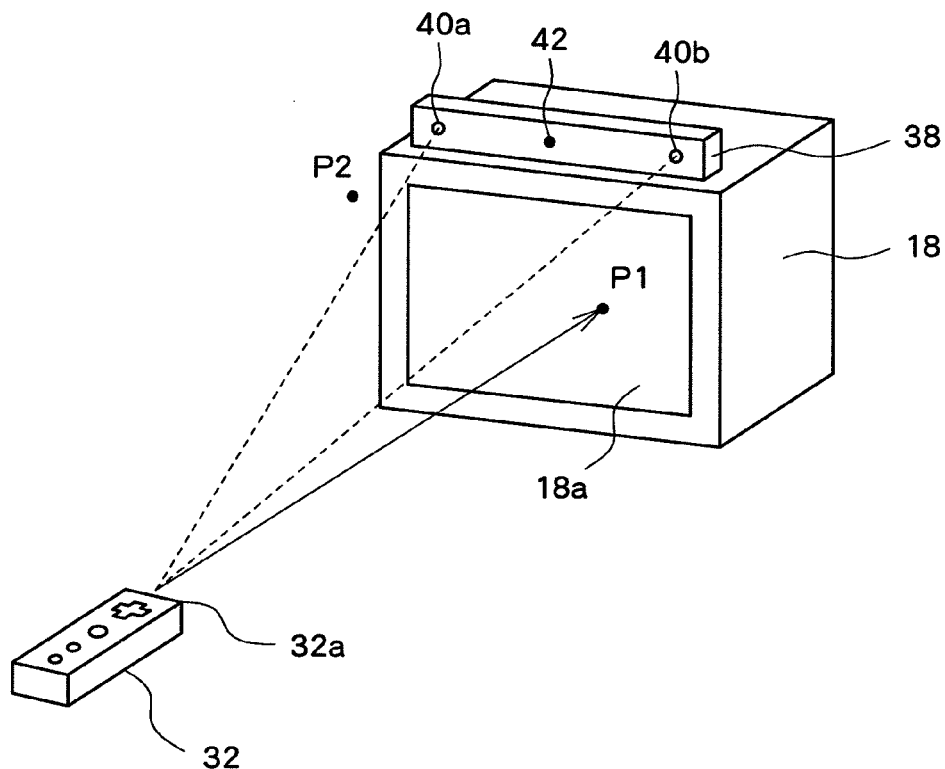
FIG. 2 is a diagram illustrating an example of an operation input unit.
Figure 3:
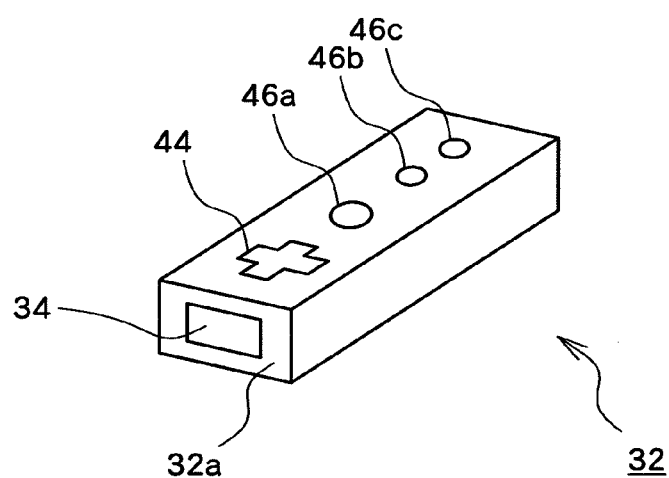
FIG. 3 is a diagram illustrating an example of a controller.

The operation input unit 31 is used for allowing a user to perform an operation input. The operation input unit 31 has a function as, for example, a pointing device for allowing the user to point to a position on the game screen displayed on the monitor 18. As the operation input unit 31, it is possible to use, for example, technology disclosed in JP 3262677 B. The operation input unit 31 includes one or a plurality of controllers 32 and one light-emitting unit 38. Each of the controllers 32 includes an image-pickup unit 34 and a photographed-image analysis unit 36. FIG. 2 is a diagram illustrating an example of the operation input unit 31. FIG. 3 is a diagram illustrating an example of the controller 32.

As illustrated in FIG. 2, the light emitting unit 38 is disposed on top of the monitor 18. The light emitting unit 38 is provided with a plurality of light sources. In the example of FIG. 2, the light emitting unit 38 is provided with light sources 40a and 40b on both end portions thereof. As illustrated in FIG. 3, the controller 32 is provided with a direction button 44 and buttons 46a, 46b, and 46c on a surface thereof. The direction button 44 has a cross shape, and is generally used to instruct which direction a character or a cursor be moved toward. The buttons 46a, 46b, and 46c are used for various kinds of game operations. The controller 32 is provided with, for example, the image-pickup unit 34 serving as an image-pickup element, such as a CCD, on a side surface thereof. In addition, the controller 32 has, for example, the photographed-image analysis unit 36, such as a microprocessor, built therein. Note that a side surface portion to which the image-pickup unit 34 is provided is referred to as a "front end portion 32a of the controller 32".

When the user aims the front end portion 32a of the controller 32 at the monitor 18, the light sources 40a and 40b are reflected on a photographed image of the image-pickup unit 34. The photographed-image analysis unit 36 analyzes the positions of the light sources 40a and 40b reflected on the photographed image of the image-pickup unit 34. The photographed-image analysis unit 36 acquires a position and an inclination of the controller 32 based on the analysis results. To be more specific, the photographed-image analysis unit 36 calculates a relative position of the controller 32 with respect to a predetermined reference position 42 and an inclination angle of the controller 32 with respect to a straight line that connects the light sources 40a and 40b. The game device 10 stores information related to a positional relationship between the reference position 42 and the game screen 18a displayed on the monitor 18, and based on this information and the position and the inclination of the controller 32 acquired by the photographed-image analysis unit 36, a screen coordinate value of a position pointed by the front end portion 32a of the controller 32 is acquired.

Figure 4:
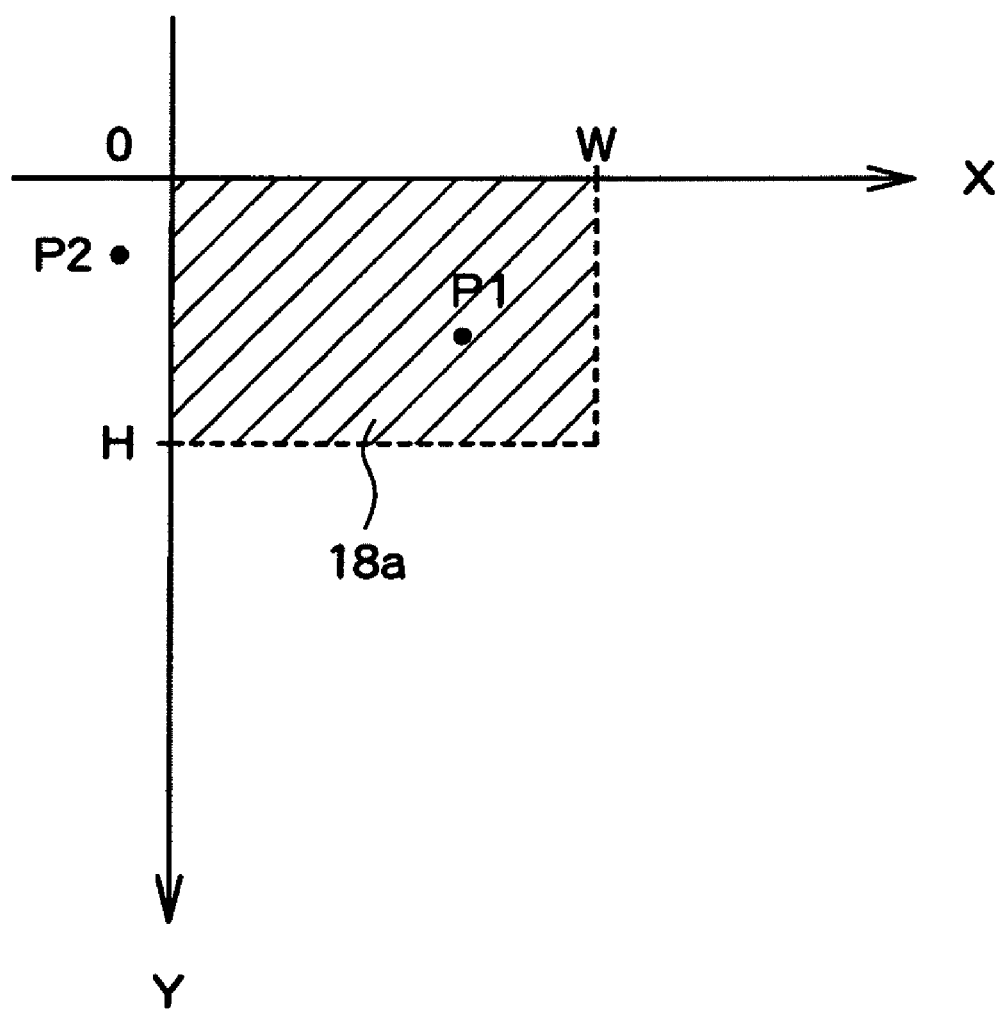
FIG. 4 is a diagram illustrating a screen coordinate system.

Here, the screen coordinate value represents a coordinate value in a screen coordinate system. As illustrated in FIG. 4, the screen coordinate system represents a coordinate system in which the origin point is set to the top left corner of the game screen 18a, the X-axis positive direction is set to the rightward direction of the game screen 18a, and the Y-axis positive direction is set to the downward direction of the game screen 18a. As illustrated in FIG. 4, a predetermined region in the screen coordinate system, that is, a region (diagonally shaded region) that satisfies the condition "$0 \leq X \leq W$ and $0 \leq Y \leq H$" is the region displayed on the monitor 18. Note that "W" denotes a width of the game screen 18a, and "H" denotes a height of the game screen 18a.

Note that the position pointed to by the front end portion 32a of the controller 32 is referred to as a "designation position of the controller 32". In addition, the information indicating the position and the inclination of the controller 32 acquired by the photographed-image analysis unit 36, that is, information for identifying the screen coordinate value of the designation position of the controller 32 is referred to as "pointing information".

The screen coordinate value of the designation position of the controller 32 is acquired as described above, and hence the screen coordinate value of the designation position of the controller 32 is acquired as long as the light sources 40a and 40b are reflected on the photographed image of the image-pickup unit 34. For example, in a case where the front end portion 32a of the controller 32 is aimed at a point P1 within the game screen 18a illustrated in FIGS. 2 and 4, a screen coordinate value of the point P1 is acquired. Further, for example, even in a case where the front end portion 32a of the controller 32 is aimed at a point P2 outside the game screen 18a illustrated in FIGS. 2 and 4, a screen coordinate value of the point P2 is acquired as long as the light sources 40a and 40b are reflected on the photographed image of the image-pickup unit 34.

An operation signal indicating an operation state of the controller 32 is transmitted every predetermined cycle (for example, every 1/60 seconds) from the controller 32 to the controller interface 30. The operation signal includes, for example, identification information for identifying the controller 32, the above-mentioned pointing information, and information indicating a depression state of each button. The controller interface 30 passes the operation signal received from the controller 32 to the microprocessor 14 via the bus 12. The microprocessor 14 judges a game operation performed by each of the controllers 32 based on the operation signal. For example, the microprocessor 14 identifies the designation position of the controller 32 based on the operation signal (pointing information). Further, for example, based on the operation signal, the microprocessor 14 judges whether or not a depression operation is performed on the direction button 44, or the buttons 46a, 46b, or 46c.

On the game device 10 having the above-mentioned configuration, a soccer game is provided by executing a program for a soccer game read from the optical disk 25.

Figure 5:
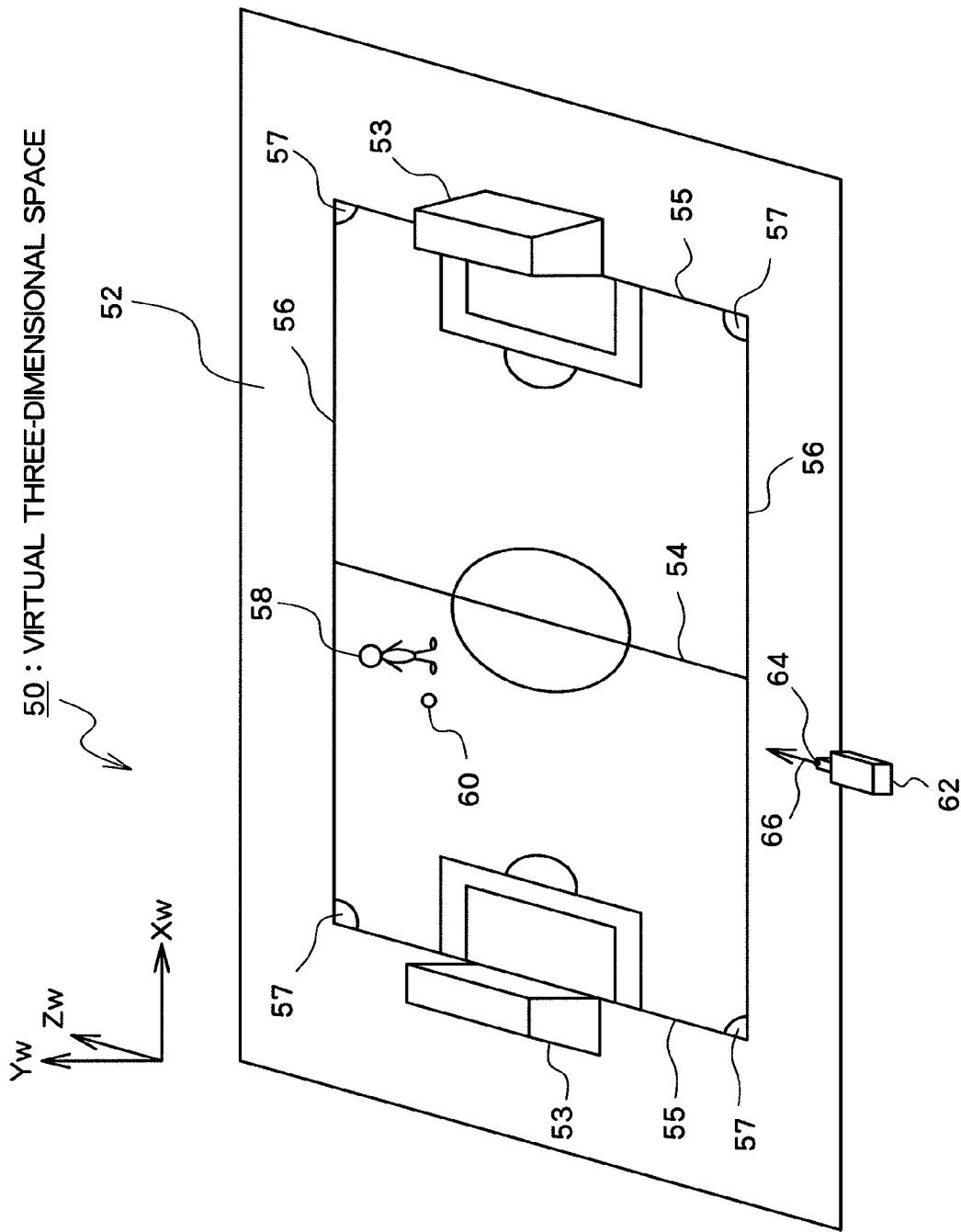
FIG. 5 is a diagram illustrating an example of a virtual three-dimensional space.

FIG. 5 illustrates an example of a virtual three-dimensional space (game space) built in the main memory 26. As illustrated in FIG. 5, a field object 52 representing a soccer field and goal objects 53 each representing a goal are located in a virtual three-dimensional space 50, which forms a soccer match venue. The field object 52 is located in parallel with an XwZw plane. For example, a center line 54, goal lines 55, touch lines 56, and corner areas 57 are drawn on the field object 52. Note that within a region surrounded by the goal lines 55 and the touch lines 56, there are a region extending from the center line 54 and one of the goal lines 55 and a region extending from the center line 54 and the other goal line 55. Of those two regions, the region in which the goal object 53 of a user's operation subject team is located is referred to as "own field", while the region in which the goal object 53 of an opposing team is located is referred to as "opponent's field". Herein, the goal object 53 of the operation subject team represents the goal object 53 to be protected by the operation subject team, while the goal object 53 of the opposing team represents the goal object 53 to be protected by the opposing team.

Player objects 58 each representing a soccer player and a ball object 60 representing a soccer ball are located on the field object 52. Though omitted from FIG. 5, eleven player objects 58 belonging to the operation subject team and eleven player objects 58 belonging to the opposing team are located on the field object 52.

A virtual camera 62 (viewpoint 64 and viewing direction 66) is set in the virtual three-dimensional space 50. The virtual camera 62 moves according to the movement of the ball object 60. A state of the virtual three-dimensional space 50 viewed from the virtual camera 62 is displayed on the monitor 18. In other words, a state of a partial region (display subject region) in the virtual three-dimensional space 50 determined on the basis of the viewpoint 64 and the viewing direction 66 is displayed on the monitor 18.

Figure 6:
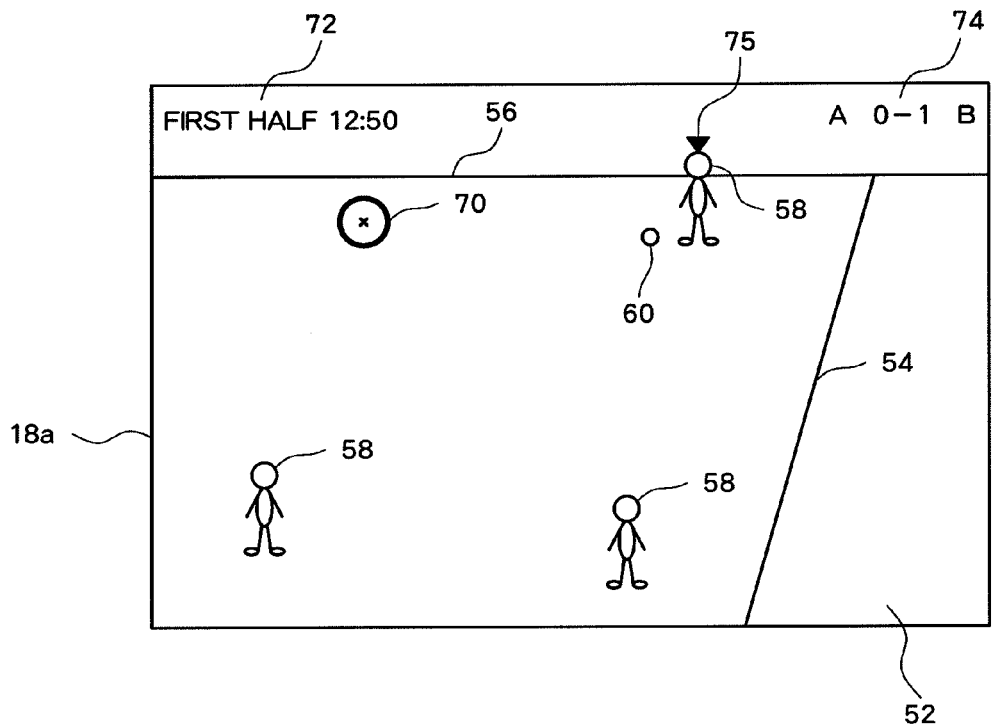
FIG. 6 is a diagram illustrating an example of a game screen.

FIG. 6 illustrates an example of the game screen 18a. As illustrated in FIG. 6, an image (field-of-view image) showing a state of the virtual three-dimensional space 50 viewed from the virtual camera 62 is displayed on the game screen 18a. Further a circular-shaped cursor 70, an elapsed-time image 72 indicating an elapsed time, and a scoring situation image 74 indicating scoring situations of both teams are displayed on the game screen 18a. If the designation position of the controller 32 is within the game screen 18a, the cursor 70 is displayed in the designation position of the controller 32. In addition, on the game screen 18a, an operation subject guiding image 75 is displayed above the head of the player object 58 (player object 58 of the operation subject) acting according to the operation state of the controller 32. Player objects 58 other than the player object 58 of the operation subject are operated by a computer.

In the soccer game, the user selects the operation subject from among the player objects 58 belonging to the operation subject team. The user moves the cursor 70 over the player object 58 to be the operation subject, and depresses an operation subject setting button (for example, the button 46c). At this time, the player object 58 over which the cursor 70 has been moved is set as the operation subject.

Further, the user designates a moving direction of the player object 58 of the operation subject by pointing the moving direction with the front end portion 32a of the controller 32. The player object 58 of the operation subject moves toward a position on the field object 52 corresponding to the display position of the cursor 70.

Further, when the user depresses the movement target position setting button (for example, button 46b), the position on the field object 52 corresponding to the display position of the cursor 70 at that point in time is set as a movement target position of the player object 58 of the operation subject. Once the movement target position is set, the player object 58 starts to move toward the movement target position irrespective of the display position of the cursor 70. In this case, the player object 58 continues to move toward the movement target position even after the user switches the operation subject to another player object 58.

Further, the user designates a kicking direction of the player object 58 of the operation subject by pointing in the kicking direction with the front end portion 32a of the controller 32. When the user depresses a kick instructing button (for example, button 46a) while the player object 58 of the operation subject is keeping the ball object 60, the player object 58 starts to kick the ball object 60 toward the position on the field object 52 corresponding to the display position of the cursor 70. For example, when the user depresses the kick instructing button while the cursor 70 is being moved toward the position of another player object 58, a pass is performed toward the another player object 58.

The soccer game employs such an operation system as described above, which allows the user to perform, for example, a series of game plays (A) to (E) as follows.

(A) By setting a position in the vicinity of the corner area 57 within the opponent's field as the movement target position for the player object 58 (herein, referred to as "first player object") keeping the ball object 60, the first player object is caused to start dribbling toward the vicinity of the corner area 57 within the opponent's field.

(B) Subsequently, the operation subject is switched from the first player object to another player object 58 (hereinafter, referred to as "second player object").

(C) Subsequently, by setting a position in front of the goal object 53 within the opponent's field as the movement target position for the second player object, the second player object is caused to start movement toward the front of the goal object 53 within the opponent's field.

(D) Subsequently, the operation subject is switched again to the first player object.

(E) Then, when the first player object arrives at the movement target position, the first player object is caused to perform a cross toward the second player object.

Further, the soccer game is provided with a function that allows a user to set a position in the vicinity of the corner area 57 or the goal object 53 within the opponent's field as the movement target position for the player object 58 even if the vicinity thereof is not being displayed on the game screen 18a. Hereinafter, description is given of such an outside-screen movement target position setting function. Note that the following description is given by taking an example case where the user sets the vicinity of the corner area 57 or the goal object 53 within the opponent's field as the movement target position with the game screen 18a illustrated in FIG. 6 being displayed. In addition, with the game screen 18a illustrated in FIG. 6 being displayed, the user's operation subject team is assumed to be making an attack toward the leftward direction of the game screen 18a (Xw-axis negative direction illustrated in FIG. 5).

Figure 7:
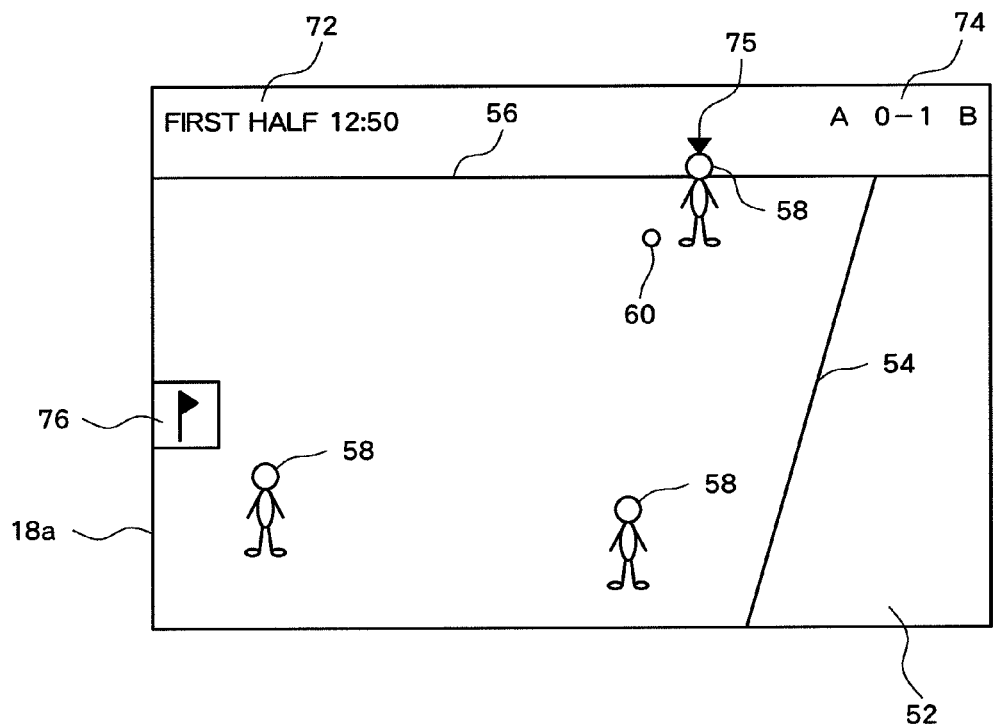
FIG. 7 is a diagram illustrating an example of the game screen.

If the user wishes to set the vicinity of the corner area 57 or the goal object 53 within the opponent's field as the movement target position, the user aims the front end portion 32a of the controller 32 toward a direction of the corner area 57 or the goal object 53 within the opponent's field. FIG. 7 illustrates an example of the game screen 18a in that case. As illustrated in FIG. 7, an outside-screen movement target position setting icon 76 is displayed on the game screen 18a in that case. The outside-screen movement target position setting icon 76 is displayed at a position on a straight line that connects the designation position of the controller 32 and the display position of the player object 58 of the operation subject on the game screen 18a, and is displayed at a position in the vicinity of the end of the game screen 18a.

Figure 8:
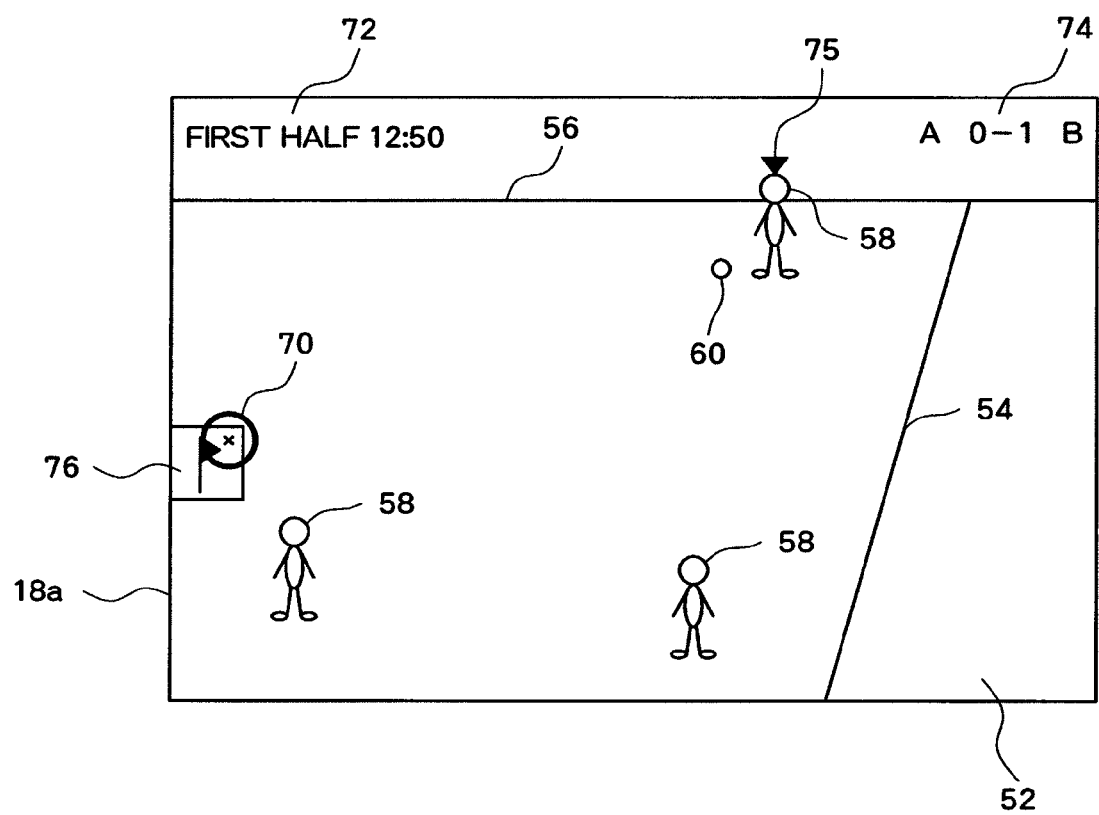
FIG. 8 is a diagram illustrating an example of the game screen.

The outside-screen movement target position setting icon 76 is kept displayed over a predetermined period of time (in the case of this embodiment, 3 seconds) even after the user aims the front end portion 32a of the controller 32 toward the inside of the game screen 18a again. During this period, by aiming the front end portion 32a of the controller 32 at the outside-screen movement target position setting icon 76, the user moves the cursor 70 again displayed on the game screen 18a toward the outside-screen movement target position setting icon 76. FIG. 8 illustrates an example of the game screen 18a in that case. While maintaining this state, the user depresses a movement target position setting button (for example, the button 46b).

On the game device 10, a movement target position candidate to be the movement target position is set in advance. FIG. 9 illustrates the movement target position candidate set in a case where the operation subject team makes an attack toward the Xw-axis negative direction. Note that a diagonally shaded region 52a illustrated in FIG. 9 indicates a region (display subject region) displayed on the game screen 18a (FIGS. 6 to 8) on the field object 52. As illustrated in FIG. 9, movement target position candidates Ma, Mb, and Mc are set in front of the goal object 53 or in the vicinity of the corner area 57 within the opponent's field. Each of the movement target position candidates Ma, Mb, and Mc is associated with one of partial ranges Ra, Rb, and Rc on the goal line 55 within the opponent's field. The movement target position candidate Ma is associated with the range Ra. Similarly, the movement target position candidates Mb and Mc are associated with the ranges Rb and Rc, respectively.

If the movement target position setting button is depressed with the controller 32 pointing at the outside-screen movement target position setting icon 76, one of the movement target position candidates Ma, Mb, and Mc is decided as the movement target position in the following manner. That is, first, a position P on the field object 52 corresponding to the designation position of the controller 32 is acquired. Subsequently, an intersection point I of a straight line extending from a position U of the player object 58 of the operation subject to the position P or its extended line and the goal line 55 within the opponent's field is acquired. Subsequently, it is judged which of the ranges Ra to Rc of the goal line 55 the intersection point I belongs to. Then, the movement target position candidate associated with the range to which the intersection point I belongs is decided as the movement target position. For example, if the intersection point I belongs to the range Ra, the movement target position candidate Ma is decided as the movement target position.

If one of the movement target position candidates is decided as the movement target position, the player object 58 of the operation subject starts movement toward the movement target position. For example, if the player object 58 of the operation subject is keeping the ball object 60, the player object 58 starts dribbling toward the movement target position. In this case, after dribbling to arrive at the movement target position, the player object 58 performs a predetermined action (hereinafter, referred to as "post-arrival action"). The post-arrival action is changed depending upon whether or not a position (hereinafter, referred to as "movement start position") of the player object 58 at the point in time of depression of the movement target position setting button is within the own field. FIG. 10 is a diagram illustrating a relationship between the movement start position and the post-arrival action. As illustrated in FIG. 10, if the movement start position is within the own field, the post-arrival action is set to a ball keeping action. In this case, the player object 58 keeps the ball object 60 in the vicinity of the movement target position unless another action instructing operation (for example, a kick instructing operation) is performed on the player object 58. Meanwhile, if the movement start position is within the opponent's field, the post-arrival action is changed depending upon the movement target position. The post-arrival action in the case where the movement target position is, for example, the movement target position candidate Ma or Mc is set to a cross action. Alternatively, the post-arrival action in the case where the movement target position is, for example, the movement target position candidate Mb is set to the ball keeping action.

According to the above-mentioned outside-screen movement target position setting function, the user becomes able to set a position in the vicinity of the corner area 57 or the goal object 53 within the opponent's field as the movement target position for the player object 58 even if the vicinity thereof is not being displayed on the game screen 18*a*. Further, the user becomes able to select the movement target position from among a plurality of movement target position candidates set in the vicinity of the corner area 57 or the goal object 53 within the opponent's field by adjusting the designation position of the controller 32.

Further, according to the outside-screen movement target position setting function, any one of the movement target position candidates cannot be set as the movement target position just by the user directing toward the outside of the game screen 18*a* by the controller 32. Any one of the movement target position candidates cannot be set as the movement target position until the user depresses the movement target position setting button while the controller 32 is being pointed at the outside-screen movement target position setting icon 76 displayed in the case where the controller 32 points at the outside of the game screen 18*a*. This prevents any one of the movement target position candidates from being erroneously set as the movement target position when the user happens to direct the front end portion 32*a* of the controller 32 to the outside of the game screen 18*a*.

Incidentally, in a case where the user performs the above-mentioned series of game plays (A) to (E), if the movement start position for the first player object is within the opponent's field, a time necessary for the first player object to arrive at the movement target position becomes shorter, and hence the user must speedily perform an operation subject switching operation (B) to the second player object, a movement instructing operation (C) with respect to the second player object, an operation subject switching operation (D) to the first player object, and a cross instructing operation (E) with respect to the first player object, which tends to cause an operation error. In this respect, in the above-mentioned outside-screen movement target position setting function, if the movement start position is within the opponent's field with the movement target position candidate Ma or Mc being set as the movement target position, after dribbling to arrive at the movement target position, the player object 58 automatically performs a cross toward the front of the goal object 53. This eliminates the necessity for the user to perform the operation subject switching operation (D) to the first player object or the centering instructing operation (E) to the first player object, and hence the user can concentrate on the operation with respect to the second player object, which can prevent the operation error.

Hereinafter, description is given of a configuration for implementing the above-mentioned outside-screen movement target position setting function.

Figures 11, 12:
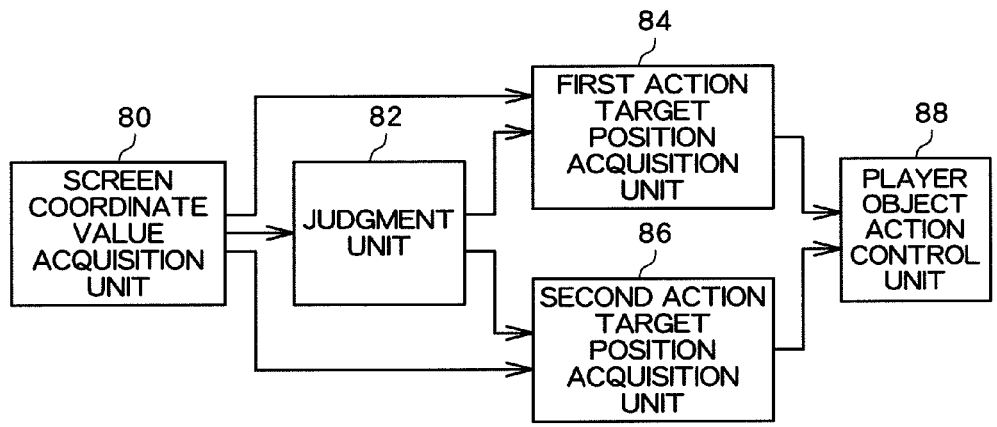
FIG. 11 is a functional block diagram of the game device according to the embodiment of the present invention.
FIG. 12 is a diagram illustrating an example of a player object information table.

First, description is given of functions implemented by the game device 10. FIG. 11 is a functional block diagram mainly illustrating functions related to the present invention among the functions implemented by the game device 10. As illustrated in FIG. 11, the game device 10 functionally includes a screen coordinate value acquisition unit 80, a judgment unit 82, a first action target position acquisition unit 84, a second action target position acquisition unit 86, and a player object action control unit 88 (game character action control means). Those functional blocks are implemented by the microprocessor 14 executing a program read from the optical disk 25.

The screen coordinate value acquisition unit 80 is implemented mainly by the microprocessor 14. The screen coordinate value acquisition unit 80 acquires the screen coordinate value according to the user's operation. In the case of this embodiment, the screen coordinate value acquisition unit 80 acquires the screen coordinate value according to a posture of the controller 32.

The judgment unit 82 is implemented mainly by the microprocessor 14. The judgment unit 82 judges whether or not the designation position of the controller 32 is within the game screen 18*a*. In the case of this embodiment, the judgment unit 82 judges whether or not the screen coordinate value acquired by the screen coordinate value acquisition unit 80 is a screen coordinate value within the game screen 18*a*.

The first action target position acquisition unit 84 is implemented mainly by the microprocessor 14. If it is judged that the designation position of the controller 32 is within the game screen 18*a*, the first action target position acquisition unit 84 acquires a position on the field object 52 corresponding to the designation position of the controller 32 as the movement target position for the player object 58 of the operation subject.

The second action target position acquisition unit 86 is implemented mainly by the microprocessor 14 and the optical disk 25. If it is judged that the designation position of the controller 32 is outside the game screen 18*a*, the second action target position acquisition unit 86 acquires a position on the field object 52 outside the display subject region as the movement target position for the player object 58 of the operation subject based on the designation position of the controller 32.

In the case of this embodiment, the second action target position acquisition unit 86 stores the movement target position candidates (Ma to Mc; see FIG. 9) set to within the opponent's field, in association with each of the plurality of ranges (Ra to Rc; see FIG. 9) of the goal line 55 on the opponent's field side.

Further, if it is judged that the designation position of the controller 32 is outside the game screen 18*a*, the second action target position acquisition unit 86 causes the outside-screen movement target position setting icon 76 to be displayed on the game screen 18*a*. Then, the second action target position acquisition unit 86 monitors whether or not the controller 32 is pointing at the outside-screen movement target position setting icon 76 and whether or not the movement target position setting button is depressed.

If the controller 32 is pointing at the outside-screen movement target position setting icon 76 and the movement target position setting button is depressed, the second action target position acquisition unit 86 first acquires a direction from the position (point U; see FIG. 9) of the player object 58 of the operation subject on the field object 52 toward the position (point P; see FIG. 9) on the field object 52 corresponding to the screen coordinate value acquired by the screen coordinate value acquisition unit 80. Then, based on the acquired direction, the second action target position acquisition unit 86 performs decision on the movement target position for the player object 58 of the operation subject. That is, the second action target position acquisition unit 86 acquires the intersection point (point I; see FIG. 9) of the straight line (line L; see FIG. 9) extending from the position of the player object 58 of the operation subject toward the acquired direction and the goal line 55 on the opponent's field side. Then, the second action target position acquisition unit 86 decides the movement target position candidate associated with the range to which the acquired intersection point belongs as the movement target position from among the plurality of ranges (Ra to Rc) of the goal line 55 on the opponent's field side.

Note that the ranges (Ra to Rc) of the goal line 55 associated with the movement target position candidates (Ma to Mc), respectively, can be deemed to constitute a condition with regard to the direction from the position (point U) of the player object 58 of the operation subject on the field object 52 toward the position (point P) on the field object 52 corresponding to the screen coordinate value acquired by the screen coordinate value acquisition unit 80. Further, this direction is acquired based on the screen coordinate value acquired by the screen coordinate value acquisition unit 80, and hence the ranges (Ra to Rc) of the goal line 55 associated with the movement target position candidates (Ma to Mc), respectively, can be deemed to constitute a condition (screen coordinate value condition) with regard to the screen coordinate value acquired by the screen coordinate value acquisition unit 80.

The player object action control unit 88 is implemented mainly by the microprocessor 14. The player object action control unit 88 performs movement control on the player object 58 based on the movement target position acquired by the first action target position acquisition unit 84 or the second action target position acquisition unit 86.

In the case of this embodiment, if the movement target position of the player object 58 is acquired by the first action target position acquisition unit 84 or the second action target position acquisition unit 86, the player object action control unit 88 moves the player object 58 toward the movement target position. After the player object 58 starts the movement toward the movement target position, the player object action control unit 88 monitors whether or not the player object 58 has arrived at the movement target position.

In a case where the player object 58 has arrived at the movement target position acquired by the first action target position acquisition unit 84, if the player object 58 is the operation subject, the player object action control unit 88 causes the player object 58 to perform an action according to the operation state of the controller 32 at that point in time. Meanwhile, if the player object 58 is not the operation subject, the player object action control unit 88 causes the player object 58 to act according to a predetermined algorithm.

Alternatively, in a case where the player object 58 has arrived at the movement target position acquired by the second action target position acquisition unit 86, if the player object 58 is not keeping the ball object 60, the player object action control unit 88 executes the same action control as in the case where the player object 58 has arrived at the movement target position acquired by the first action target position acquisition unit 84. Meanwhile, if the player object 58 is keeping the ball object 60, the player object action control unit 88 executes the action control on the player object 58 as follows. That is, the player object action control unit 88 (post-arrival action information storage means) stores a position condition related to a position in the virtual three-dimensional space 50 (on the field object 52) and information (post-arrival action information) related to the post-arrival action in association with each other (see FIG. 10). Further, the player object action control unit 88 (post-arrival action information acquisition means) acquires the post-arrival action information associated with the position condition satisfied by the movement start position for the player object 58. Then, the player object action control unit 88 performs the action control on the player object 58 based on the acquired post-arrival action information.

Next, description is made of various processing executed by the game device 10 in order to implement the above-mentioned functional blocks. First described is data based on which the various processing is executed.

The optical disk 25 stores model data representing a shape of each object. In addition, the optical disk 25 stores motion data of the player object 58. The motion data is data representing a change in posture made every predetermined time (in this embodiment, $1/60^{th}$ of a second) in a case where the player object 58 performs each of various kinds of actions (for example, running action, dribbling action, and kicking action). Note that causing the player object 58 to act according to the motion data is referred to as "reproduce the motion data". Further, the optical disk 25 stores parameters indicating levels of various capabilities of the player object 58 and a position thereof.

The main memory 26 stores game situation information indicating a current situation of the game. For example, the game situation information includes display position information on the cursor 70. The display position information on the cursor 70 represents information that indicates a display position of the cursor 70 within the game screen 18*a* by a screen coordinate value.

Further, for example, the game situation information includes information indicating a state of each player object 58. With regard to the player objects 58 belonging to the operation subject team, the main memory 26 stores a player object information table as illustrated in, for example, FIG. 12. The player object information table includes "player object ID", "position", "motion data during reproduction", "motion data reproducing position", "moving direction", "moving speed", "ball keeping flag", "operation subject flag", "movement target position", and "post-arrival action" fields. Identification information (ID) of the player object 58 is stored in the "player object ID" field. Information stored in the "position", "moving direction", and "moving speed" fields indicates a current position, a moving direction, and a moving speed, respectively, of the player object 58 within the virtual three-dimensional space 50 by using a world coordinate system (XwYwZw-coordinate system illustrated in FIG. 5). Identification information (ID) of the motion data that is being currently reproduced with regard to the player object 58 is stored in the "motion data during reproduction" field. Information that indicates a position at which the motion data is being currently reproduced is stored in the "motion data reproducing position" field. A posture of the player object 58 is identified by the "motion data during reproduction" and the "motion data reproducing position" fields. Information that indicates whether or not the player object 58 is keeping the ball object 60 is stored in the "ball keeping flag" field. Information that indicates whether or not the player object 58 is the operation subject is stored in the "operation subject flag" field. Information that indicates the movement target position set with respect to the player object 58 by using the world coordinate system is stored in the "movement target position" field. Information that indicates the post-arrival action set for the player object 58 is stored in the "post-arrival action" field. Note that the same player object information table is also stored with regard to the opposing team. In the player object information table with regard to the opposing team, the "operation subject flag", "movement target position", and "post-arrival action" fields are omitted.

Further, for example, the game situation information includes information indicating states of the ball object 60 and the virtual camera 62. The information indicating the state of the ball object 60 includes information that indicates, for example, a position, a moving direction, and a moving speed of the ball object 60 within the virtual three-dimensional space 50. The information indicating the state of the virtual camera 62 includes information that indicates, for example, a position (viewpoint 64), a posture (viewing direction 66), and an angle of view of the virtual camera 62 within the virtual three-dimensional space 50. Further, for example, the game situation information includes information that indicates the elapsed time and the scoring situations.

FIGS. 13 to 16 are flowcharts mainly illustrating processing related to the outside-screen movement target position setting function among the processing executed by the game device 10 every predetermined time (in this embodiment, $1/60^{th}$ of a second). The processing is implemented by the game device 10 (microprocessor 14) executing a program read from the optical disk 25.

Figure 13:
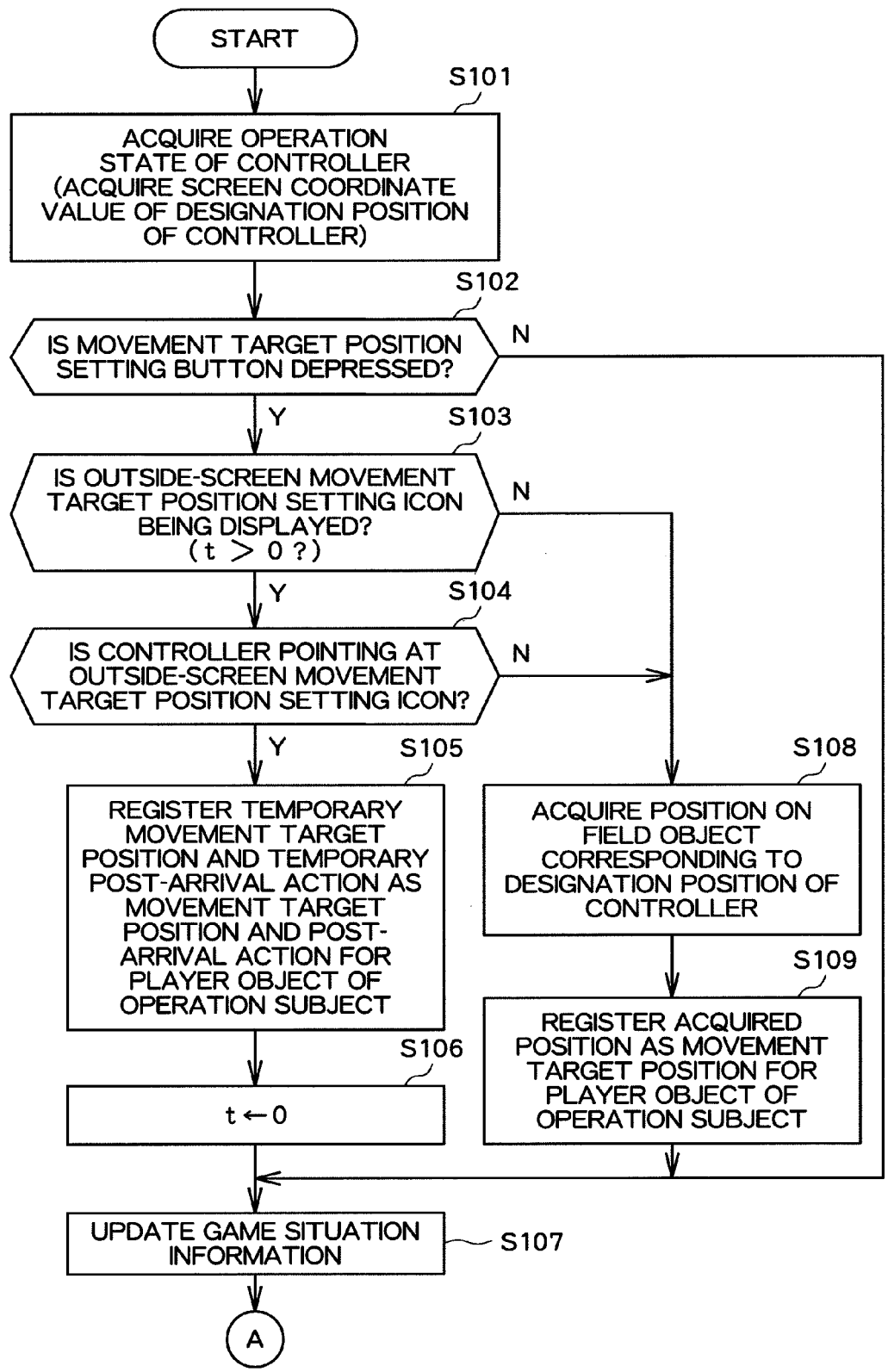
FIG. 13 is a flowchart illustrating processing executed on the game device.

As illustrated in FIG. 13, the game device 10 first acquires the operation state of the controller 32 based on the operation signal supplied from the controller 32 (S101). For example, the game device 10 judges the screen coordinate value of the designation position of the controller 32 and the depression state of each button. After that, the game device 10 judges whether or not the movement target position setting button has been depressed (S102).

If the movement target position setting button has not been depressed, the game device 10 updates the game situation information (S107). For example, the display position information on the cursor 70 is updated based on the screen coordinate value acquired in Step S101. Further, for example, the information indicating the state of the player object 58 is updated based on the designation position of the controller 32 and the depression state of each button acquired in Step S101. In addition, the information that indicates the state on the ball object 60, the information that indicates the state of the virtual camera 62, and information that indicates the elapsed time and the scoring situations of both the teams are updated. Details thereof are described later (see FIG. 22).

Figure 14:
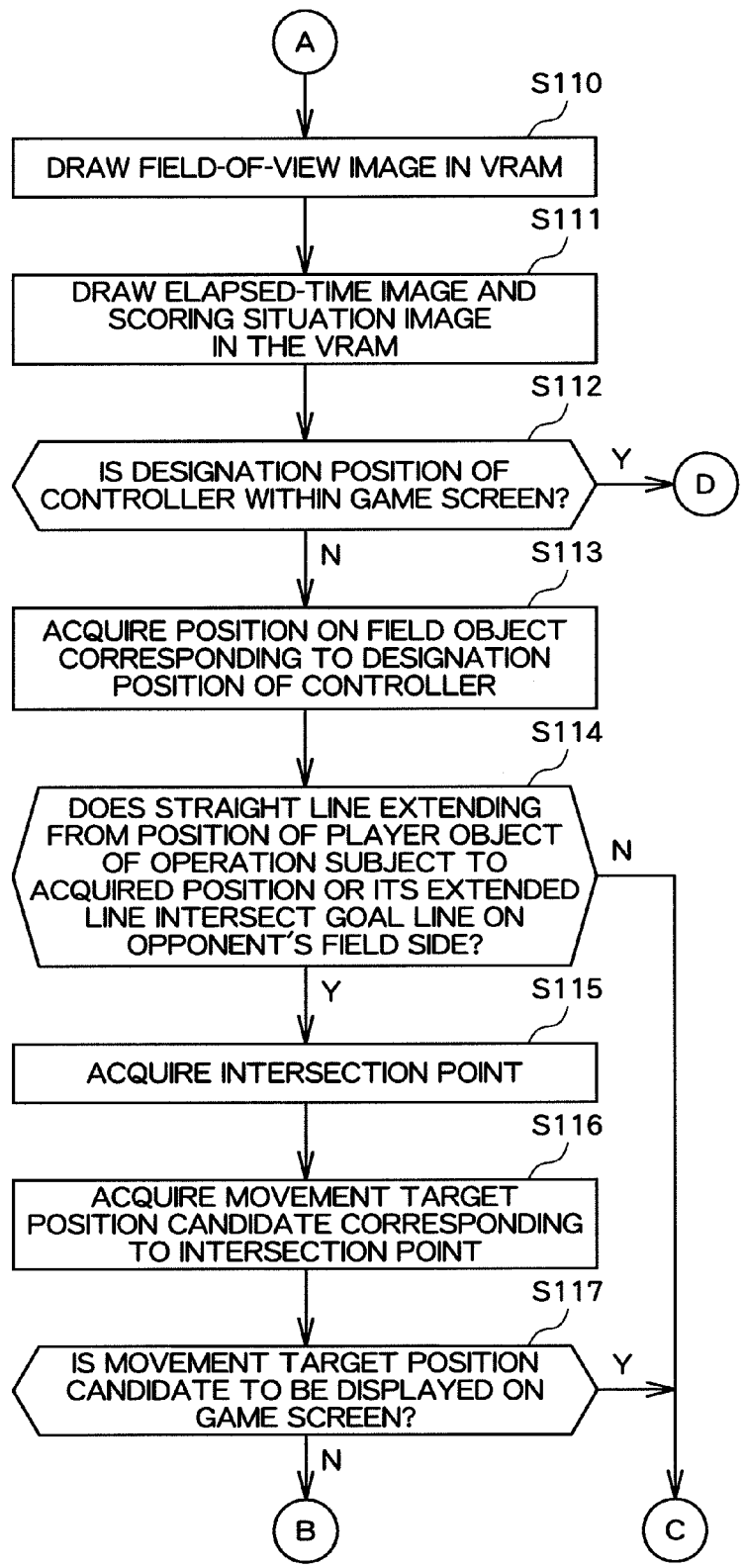
FIG. 14 is a flowchart illustrating the processing executed on the game device.
Figure 15:
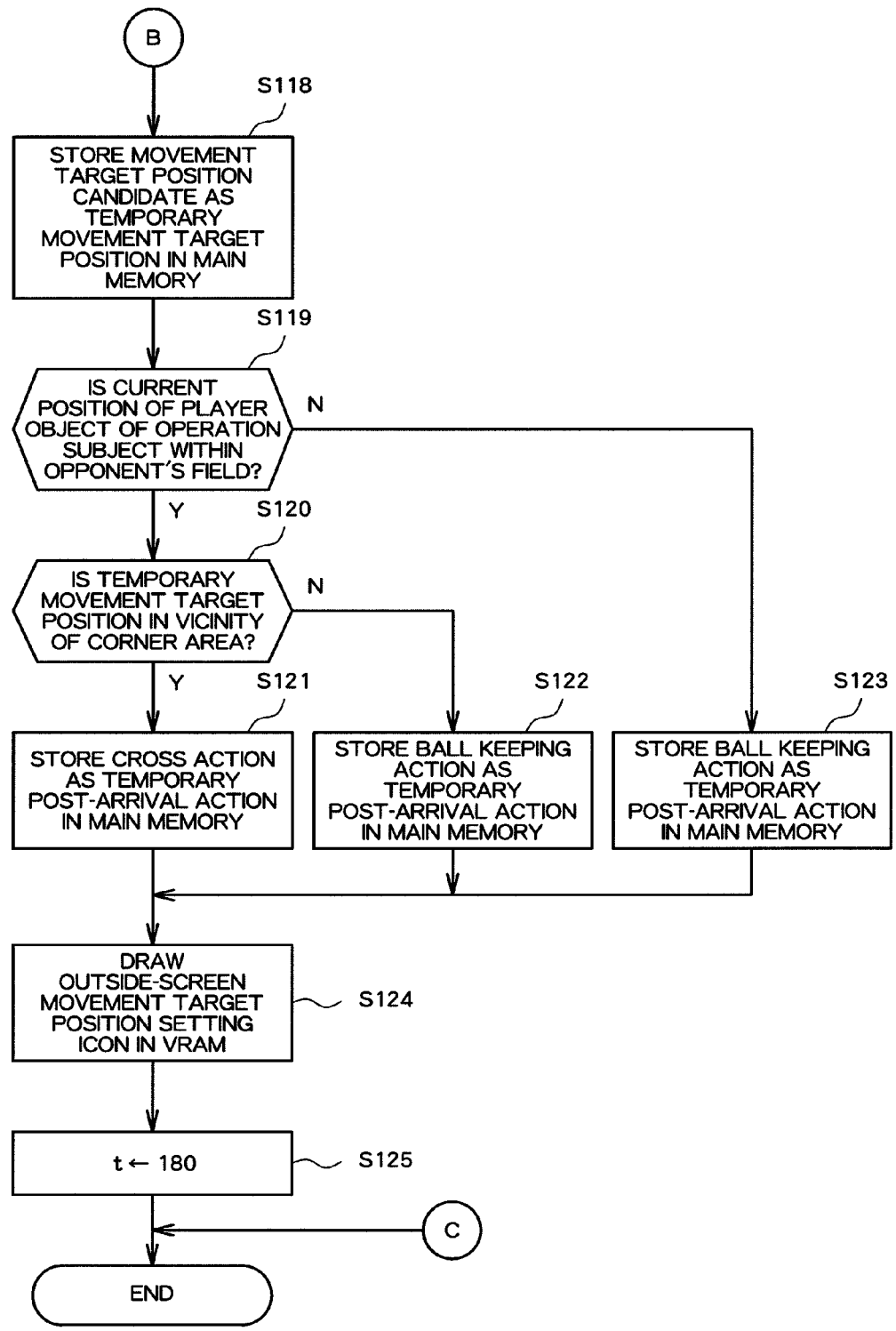
FIG. 15 is a flowchart illustrating the processing executed on the game device.
Figure 16:
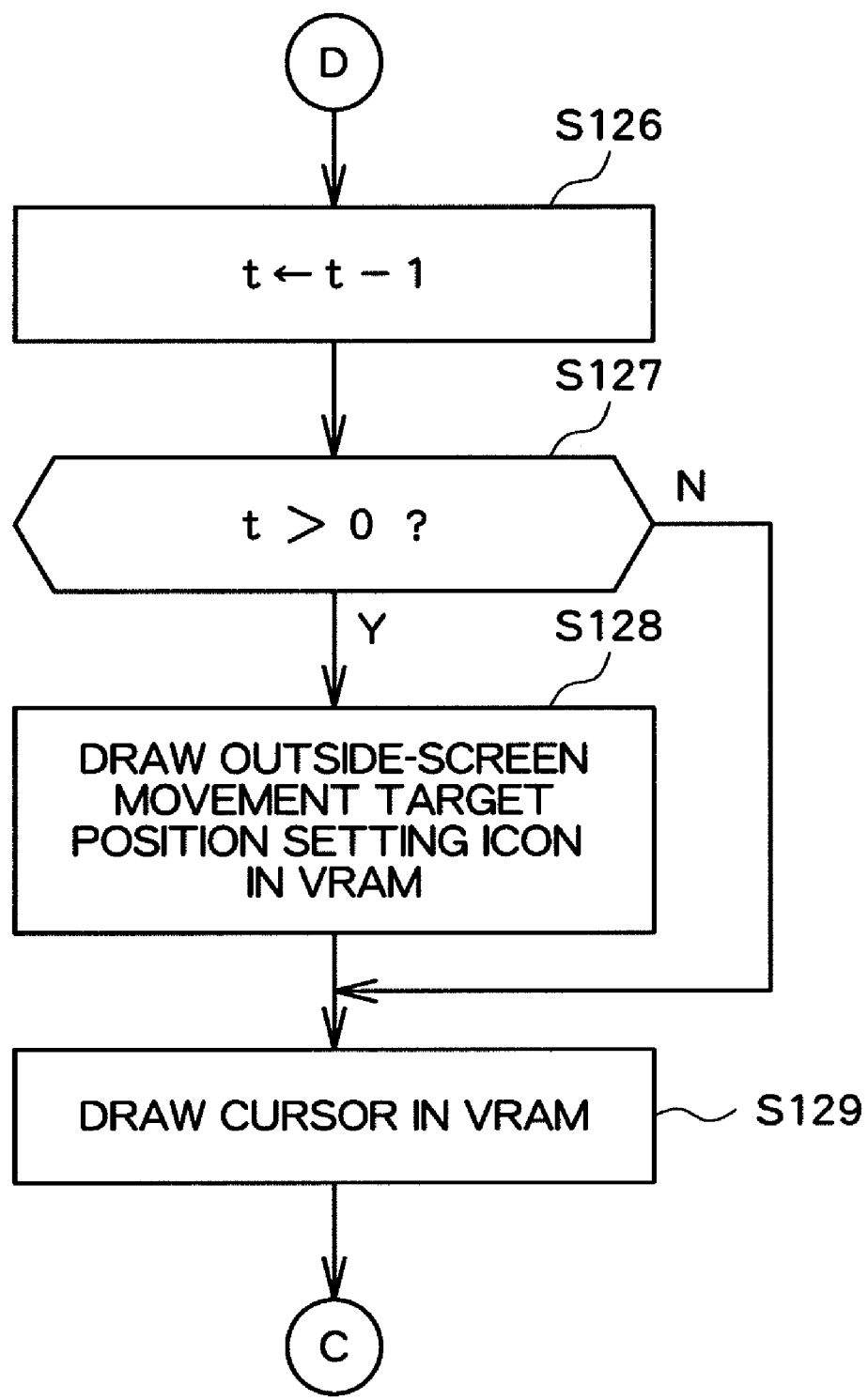
FIG. 16 is a flowchart illustrating processing executed on the game device.

When the updating of the game situation information is completed, the game device 10 generates the game screen 18a in a VRAM. As illustrated in FIG. 14, the game device 10 first coordinate-transforms vertex coordinates of each object located in the virtual three-dimensional space 50 from the world coordinate system to the screen coordinate system by using a predetermined coordinate transformation calculation, to thereby draw the field-of-view image showing the state of the virtual three-dimensional space 50 viewed from the virtual camera 62 in the VRAM (S110). To be more specific, the game device 10 executes geometry processing to perform a coordinate transformation from the world coordinate system to a viewpoint coordinate system. The viewpoint coordinate system represents a coordinate system in which the origin point is set to the viewpoint 64 with the viewing direction 66 set to a Zw-axis direction. In addition, the game device 10 also performs clipping processing. Further, the game device 10 coordinate-transforms each object within a field-of-view range from the viewpoint coordinate system to the screen coordinate system. Accordingly, the game device 10 draws the field-of-view image in the VRAM.

Subsequently, the game device 10 draws the elapsed-time image 72 and the scoring situation image 74 over the field-of-view image drawn in the VRAM (S111).

Subsequently, the game device 10 judges whether or not the designation position of the controller 32 is within the game screen 18a (S112). That is, the game device 10 judges whether or not the screen coordinate value acquired in Step S101 is included within the diagonally shaded region illustrated in FIG. 4.

Figure 17:
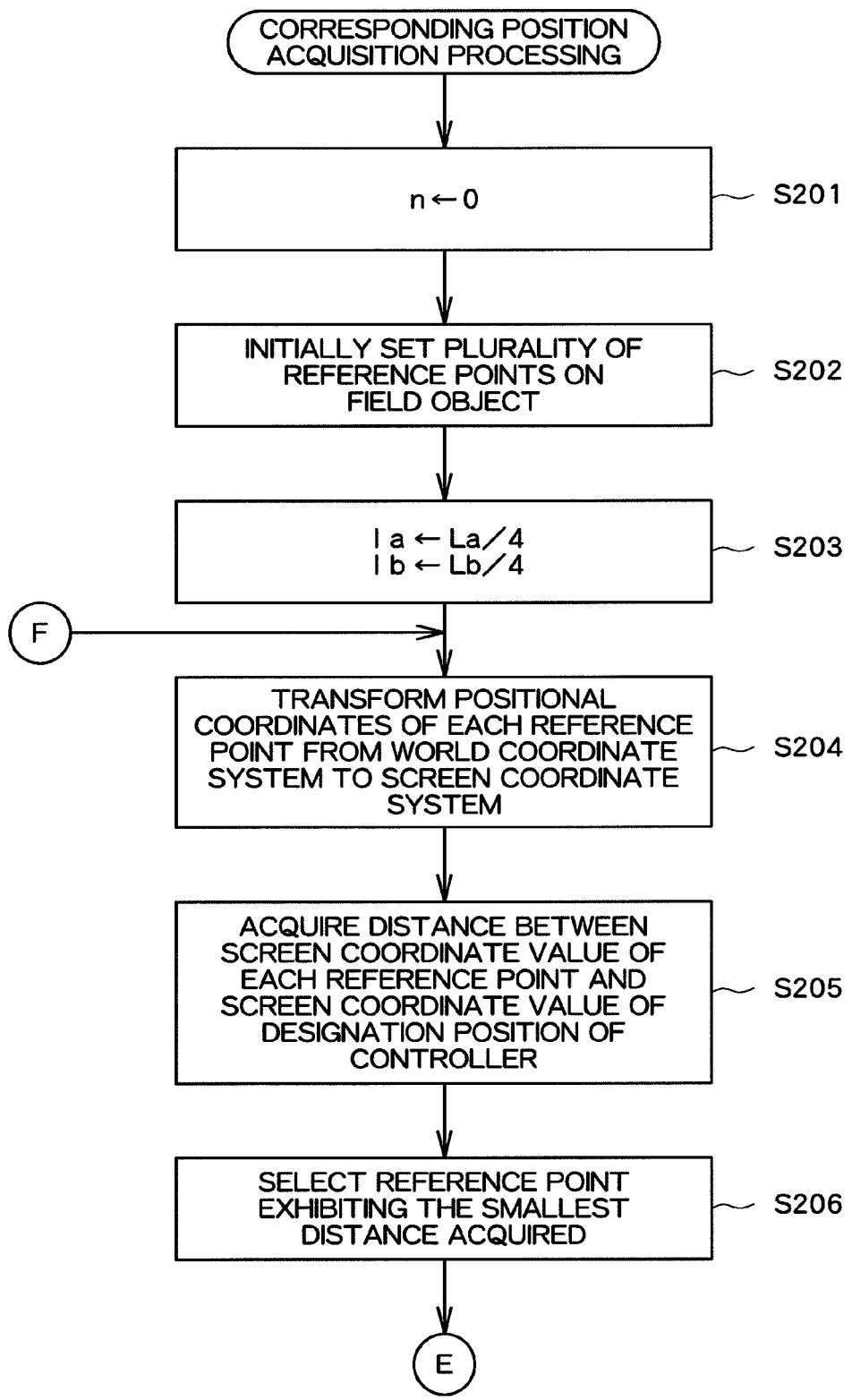
FIG. 17 is a flowchart illustrating the processing executed on the game device.
Figure 18:
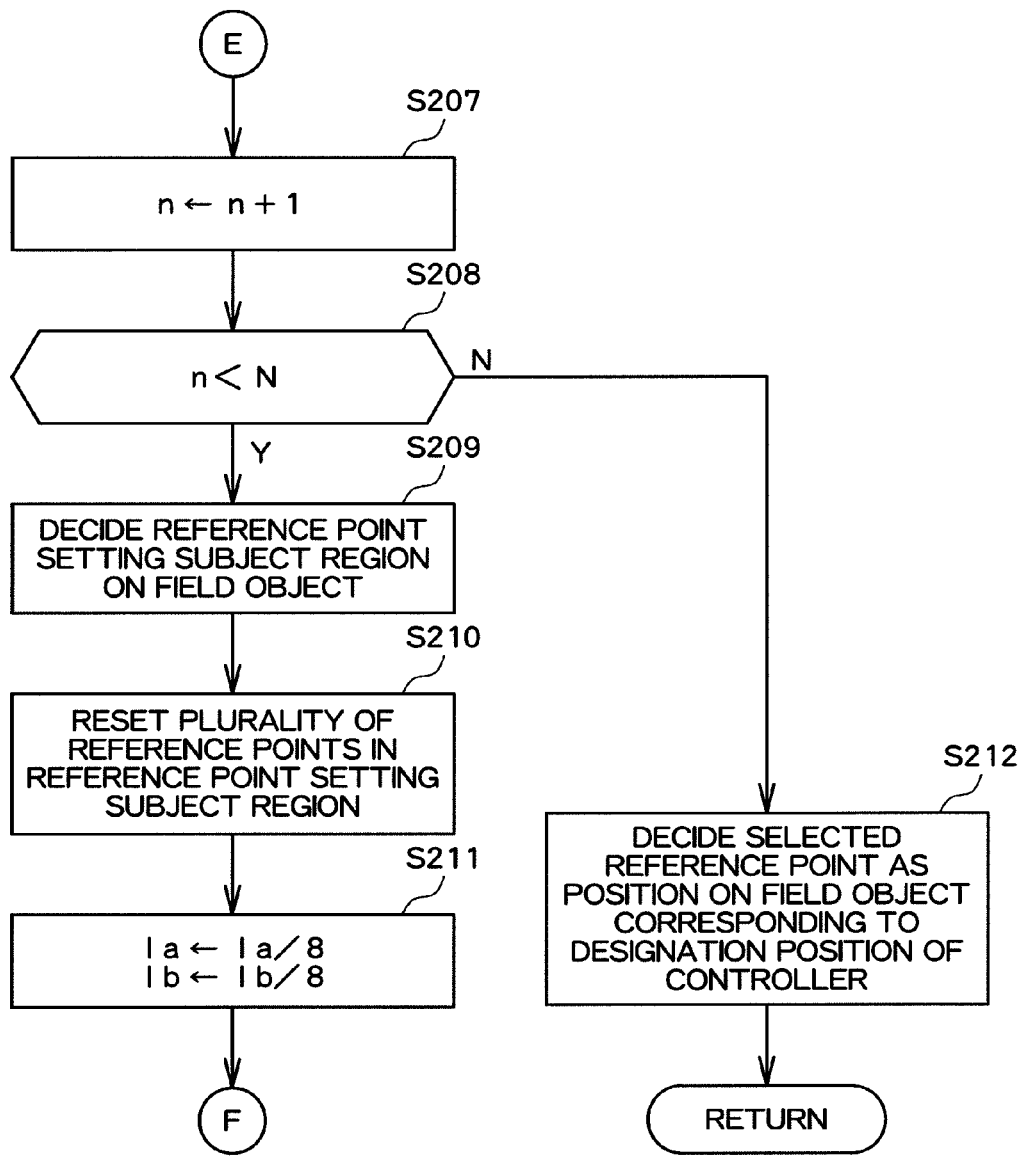
FIG. 18 is a flowchart illustrating processing executed on the game device.

If the designation position of the controller 32 is not within the game screen 18a, the game device 10 acquires the position (point P; see FIG. 9) on the field object 52 corresponding to the designation position of the controller 32 (S113). FIGS. 17 and 18 are flowcharts illustrating processing (corresponding position acquisition processing) for acquiring the position on the field object 52 corresponding to the designation position of the controller 32.

Figure 19:
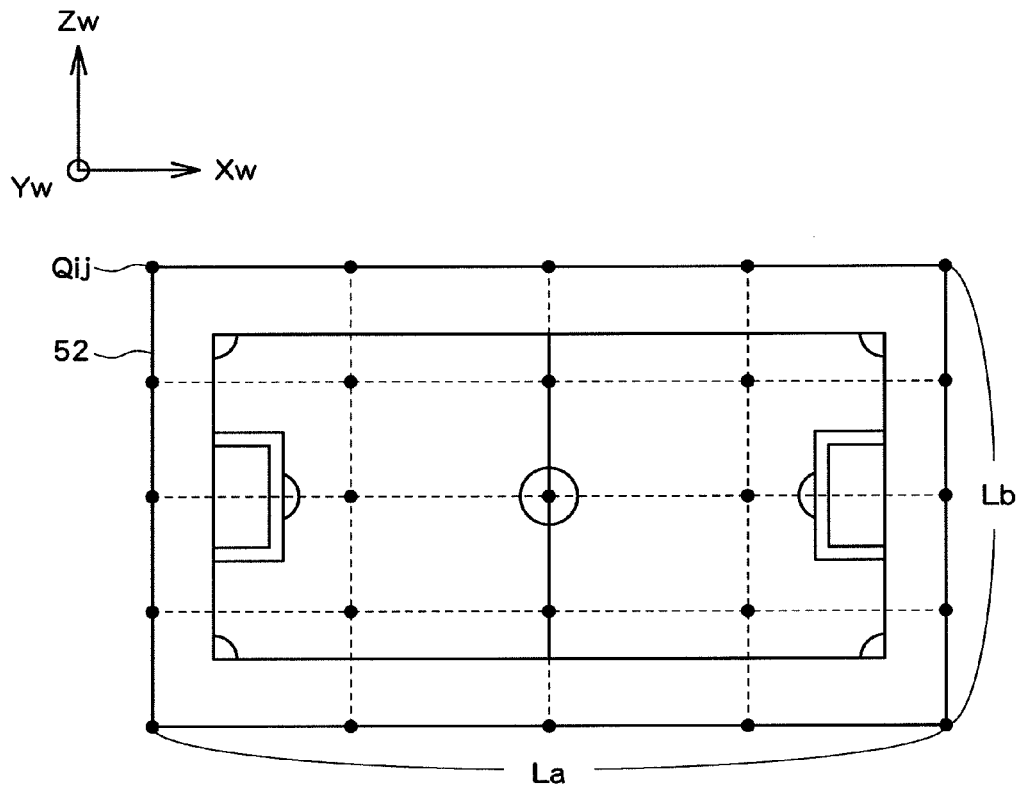
FIG. 19 is a diagram for describing initial setting of a reference point.

As illustrated in FIG. 17, the game device 10 first initializes a value of a variable "n" to 0 (S201). Further, the game device 10 initially sets a plurality of reference points on the field object 52 (S202). FIG. 19 is a diagram for describing the initial setting of the reference points. As illustrated in FIG. 19, the game device 10 acquires each vertex of blocks obtained by dividing sides of the field object 52 each into four along a long-side direction and a short-side direction, as a reference point $Q_{ij}$ (where "i" and "j" are each an integer selected from 1 to 5). Here, the reference point $Q_{11}$ denotes a reference point on the top left, while the reference point $Q_{15}$ denotes a reference point on the top right. Similarly, the reference point $Q_{51}$ denotes a reference point on the bottom left, while the reference point $Q_{55}$ denotes a reference point on the bottom right.

Further, the game device 10 initializes a variable "la" to La/4, and initializes a variable "lb" to Lb/4 (S203). Here, as illustrated in FIG. 19, "La" denotes a length of a long side of the field object 52, while "Lb" denotes a length of a short side of the field object 52.

After that, the game device 10 transforms positional coordinates of each reference point $Q_{ij}$ from the world coordinate system to the screen coordinate system to thereby acquire the screen coordinate value corresponding to each reference point $Q_{ij}$ (S204). Here, the same coordinate transformation calculation is used as the coordinate transformation calculation used to transform the vertex coordinates of each object from the world coordinate system to the screen coordinate system in Step S110.

After that, with regard to each reference point $Q_{ij}$, the game device 10 calculates a distance between the screen coordinate value corresponding to the reference point $Q_{ij}$ and the screen coordinate value acquired in Step S101 (S205). Then, the game device 10 selects a reference point $Q_{ij}$ exhibiting the smallest distance calculated in Step S205 from among the plurality of reference points $Q_{ij}$ (S206). Further, the game device 10 adds 1 to the value of the variable "n" (S207). Then, the game device 10 judges whether or not the value of the variable "n" is smaller than "N" (S208).

Figure 20:
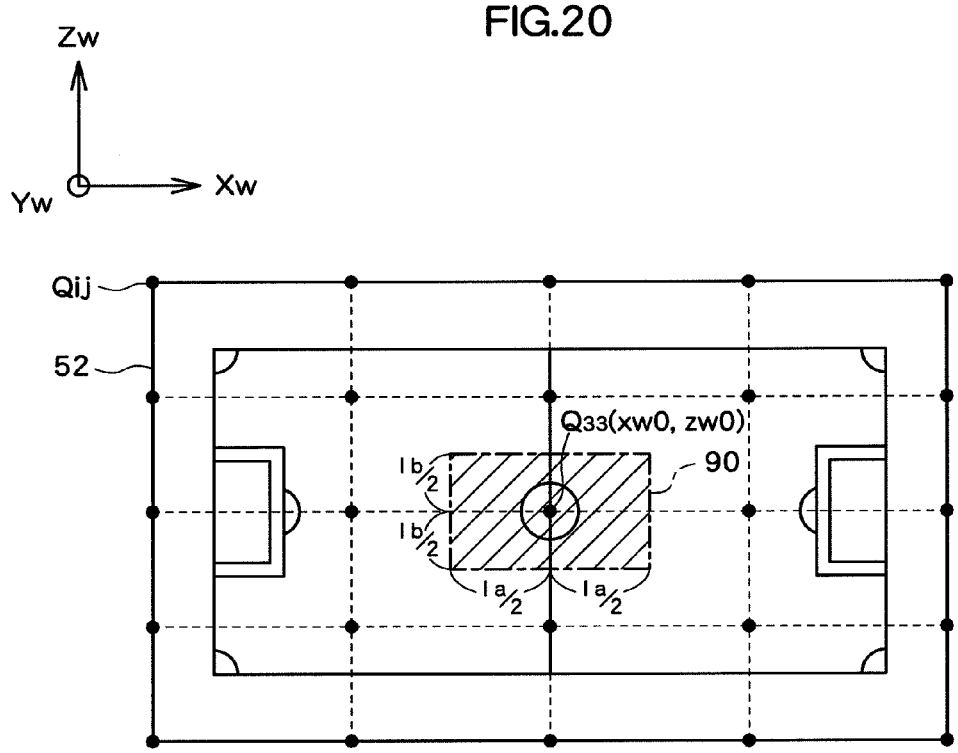
FIG. 20 is a diagram for describing a reference point setting subject region.

If the value of the variable "n" is smaller than "N", the game device 10 decides a reference point setting subject region on the field object 52 based on the reference point $Q_{ij}$ selected in Step S206 (S209). FIG. 20 is a diagram for describing the reference point setting subject region. Here, FIG. 20 illustrates the reference point setting subject region in a case where the reference point $Q_{33}$ is selected in Step S206 with the reference point $Q_{ij}$ set as illustrated in FIG. 19. As illustrated in FIG. 20, the game device 10 sets a region on the field object 52, which includes the Xw-axis coordinate and the Zw-axis coordinate (xw, zw) that satisfy the following conditions (1) and (2), as a reference point setting subject region 90. Note that in the following conditions (1) and (2), (xw0, zw0) represents the Xw-axis coordinate and the Zw-axis coordinate of the reference point $Q_{ij}$ selected in Step S206, respectively.

$$xw0-(la/2) \leq xw \leq xw0+(la/2) \quad (1)$$

$$zw0-(lb/2) \leq zw \leq zw0+(lb/2) \quad (2)$$

Figure 21:
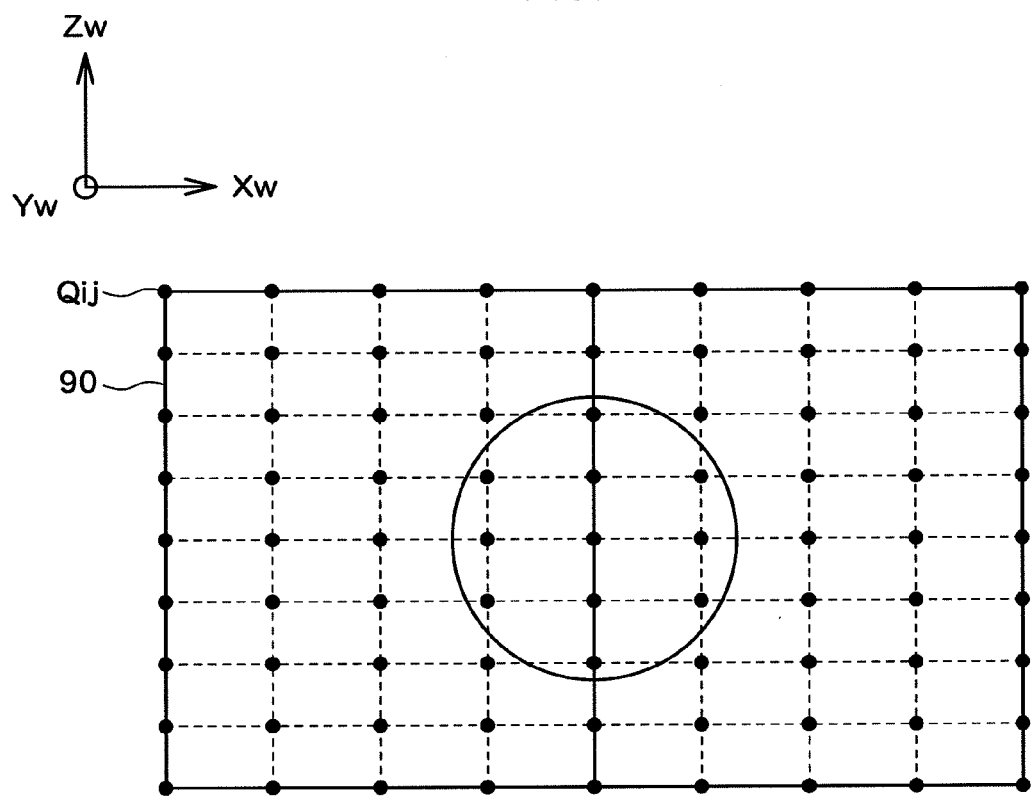
FIG. 21 is a diagram for describing resetting of the reference point.

Then, the game device 10 resets a plurality of reference points in the reference point setting subject region 90 decided in Step S209 (S210). FIG. 21 is a diagram for describing the resetting of the reference points. Here, FIG. 21 illustrates a case where the reference point setting subject region 90 is decided as illustrated in FIG. 20. As illustrated in FIG. 21, the game device 10 sets each vertex of each of blocks obtained by dividing sides of the reference point setting subject region 90 into eight along each of the long-side direction and the short-side direction, as a new reference point $Q_{ij}$ (where "i" and "j" are each an integer selected from 1 to 9). Here, the reference point $Q_{11}$ denotes the reference point on the top left, while the reference point $Q_{19}$ denotes the reference point on the top right. Similarly, the reference point $Q_{91}$ denotes the reference point on the bottom left, while the reference point $Q_{99}$ denotes the reference point on the bottom right.

After resetting the reference points $Q_{ij}$, the game device 10 updates the variable "la" to la/8, and updates the variable "lb" to lb/8 (S211). After that, the game device 10 again executes the processing from Step S204.

Meanwhile, if it is judged in Step S208 that the value of the variable "n" is not smaller than "N", the game device 10 judges that the reference point $Q_{ij}$ selected in Step S206 is a position on the field object 52 corresponding to the designation position of the controller 32 (S212).

After the position on the field object 52 corresponding to the designation position of the controller 32 is acquired, the game device 10 judges whether or not the straight line extending from the position (point U; see FIG. 9) of the player object 58 of the operation subject to the position (point P; see FIG. 9) acquired in Step S113 or its extended line intersects the goal line 55 on the opponent's field side (S114). If the above-mentioned straight line or its extended line does not intersect the goal line 55 on the opponent's field side, the subsequent processing is not executed, and an image drawn in the VRAM at that point in time is output to the monitor 18 as the game screen 18a. Therefore, on the game device 10, the outside-screen movement target position setting icon 76 is not displayed in a case where the controller 32 is not pointing in the direction of the corner area 57 or the goal object 53 on the opponent's field side even if the controller 32 is pointing at the outside of the game screen 18a.

Meanwhile, if the above-mentioned straight line or its extended line intersects the goal line 55 on the opponent's field side, the game device 10 acquires the intersection point (S115). Then, the game device 10 acquires the movement target position candidate associated with the range to which the intersection point acquired in Step S115 belongs from among the ranges (Ra to Rc) of the goal line 55 (S116).

After that, the game device 10 judges whether or not the movement target position candidate acquired in Step S116 is to be displayed on the game screen 18a (S117). In other words, the game device 10 judges whether or not the movement target position candidate acquired in Step S116 is included in the display subject region (diagonally shaded region 52a illustrated in FIG. 9) on the field object 52. In this step, the game device 10 acquires the screen coordinate value corresponding to the movement target position candidate by transforming the movement target position candidate acquired in Step S116 from the world coordinate system to the screen coordinate system. The same coordinate transformation calculation is used at this time as the coordinate transformation calculation used to transform the vertex coordinates of each object from the world coordinate system to the screen coordinate system in Step S110. Then, the game device 10 judges whether or not the screen coordinate value is included in the diagonally shaded region illustrated in FIG. 4.

If the movement target position candidate acquired in Step S116 is displayed on the game screen 18a, the subsequent processing is not executed, and the image drawn in the VRAM at that point in time is output to the monitor 18 as the game screen 18a. Therefore, on the game device 10, the outside-screen movement target position setting icon 76 is not displayed in a case where the movement target position candidate acquired in Step S116 is being displayed on the game screen 18a.

Meanwhile, if the movement target position candidate acquired in Step S116 is not displayed on the game screen 18a, the game device 10 stores the movement target position candidate acquired in Step S116 as a temporary movement target position in the main memory 26 (S118).

After that, the game device 10 judges whether or not the current position of the player object 58 of the operation subject is within the opponent's field (S119). If the current position of the player object 58 of the operation subject is not within the opponent's field, in other words, if the current position of the player object 58 of the operation subject is within the own field, the game device 10 stores the ball keeping action as a temporary post-arrival action into the main memory 26 (S123). Meanwhile, if the current position of the player object 58 of the operation subject is within the opponent's field, the game device 10 judges whether or not the temporary movement target position is in the vicinity of the corner area 57 (S120). In other words, the game device 10 judges whether or not the temporary movement target position is the movement target position candidate Ma or Mc. If the temporary movement target position is the movement target position candidate Ma or Mc, the game device 10 stores the cross action as the temporary post-arrival action into the main memory 26 (S121). Meanwhile, if the temporary movement target position is not in the vicinity of the corner area 57, in other words, if the temporary movement target position is the movement target position candidate Mb, the game device 10 stores the ball keeping action as the temporary post-arrival action into the main memory 26 (S122).

After that, the game device 10 draws the outside-screen movement target position setting icon 76 over the image drawn in the VRAM (S124). At this time, the game device 10 calculates the intersection point of a straight line, which connects the screen coordinate value acquired in Step S101 and the screen coordinate value of the display position of the player object 58 of the operation subject on the game screen 18a, and a boundary line of the diagonally shaded region illustrated in FIG. 4. Then, the game device 10 decides a drawing position of the outside-screen movement target position setting icon 76 based on the intersection point. Further, the game device 10 updates the value of the variable "t" to 180 (S125). The variable "t" represents a remaining time before the outside-screen movement target position setting icon 76 disappears from the game screen 18a, in units of $1/60^{th}$ of a second. At this time, the game screen 18a as illustrated in, for example, FIG. 7 is drawn in the VRAM, and the game screen 18a is display-output on the monitor 18 at a given timing.

In Step S112, if it is judged that the designation position of the controller 32 is within the game screen 18a, the game device 10 subtracts 1 from the value of the variable "t" (S126). Note that if the value of the variable "t" is 0, the game device 10 does not perform subtraction on the value of the variable "t". Then, the game device 10 judges whether or not the value of the variable "t" is larger than 0 (S127). If the value of the variable "t" is larger than 0, the game device 10 draws the outside-screen movement target position setting icon 76 over the image drawn in the VRAM (S128). The processing of this step is executed in a similar manner to that of Step S124. Meanwhile, if the value of the variable "t" is not larger than 0, a display period of time for the outside-screen movement target position setting icon 76 has elapsed, and hence the outside-screen movement target position setting icon 76 is not drawn.

When the processing of Steps S127 and S128 is completed, the game device 10 draws the cursor 70 over the image drawn in the VRAM (S129). At this time, the drawing position of the cursor 70 is identified based on the display position information on the cursor 70. In this case, the game screen 18a as illustrated in, for example, FIG. 6 or 8 is drawn in the VRAM, and the game screen 18a is display-output on the monitor 18 at a given timing.

If it is judged in Step S102 that the movement target position setting button has been depressed, the game device 10 judges whether or not the outside-screen movement target position setting icon 76 is being displayed (S103). That is, the game device 10 judges whether or not the value of the variable "t" is larger than 0. If the outside-screen movement target position setting icon 76 is being displayed, the game device 10 judges whether or not the controller 32 is pointing at the outside-screen movement target position setting icon 76 (S104). That is, the game device 10 judges whether or not the designation position of the controller 32 is within a region in which the outside-screen movement target position setting icon 76 is displayed within the game screen 18a.

If the outside-screen movement target position setting icon 76 is not being displayed, or if the controller 32 is not pointing at the outside-screen movement target position setting icon 76, the game device 10 acquires the position on the field object 52 corresponding to the designation position of the controller 32 (S108). The processing of this step is executed in a similar manner to that of Step S113. Then, the game device 10 stores the position acquired in Step S108 as the movement target position for the player object 58 of the operation subject into the player object information table (S109). At this time, the game device 10 sets information that indicates a direction from the current position of the player object 58 of the operation subject toward the position acquired in Step S108, in the "moving direction" field of the player object information table corresponding to the player object 58 of the operation subject. Further, the game device 10 sets an ID of running action motion data or dribbling action motion data, in the "motion data during reproduction" field of the player object information table corresponding to the player object 58 of the operation subject, and sets a value that indicates an initial position in the "motion data reproducing position" field thereof. As a result, the player object 58 starts running or dribbling toward the movement target position.

Meanwhile if the outside-screen movement target position setting icon 76 is being displayed and the controller 32 is pointing at the outside-screen movement target position setting icon 76, the game device 10 stores the temporary movement target position and the temporary post-arrival action stored in the main memory 26 as the movement target position and the post-arrival action for the player object 58 of the operation subject into the player object information table (S105). At this time, the game device 10 sets information that indicates a direction from the current position of the player object 58 of the operation subject toward the temporary movement target position, in the "moving direction" field of the player object information table corresponding to the player object 58 of the operation subject. Further, the game device 10 sets the ID of running action motion data or dribbling action motion data, in the "motion data during reproduction" field of the player object information table corresponding to the player object 58 of the operation subject, and sets the value that indicates the initial position in the "motion data reproducing position" field thereof. As a result, the player object 58 starts running or dribbling toward the movement target position. Further, the game device 10 updates the value of the variable "t" to 0 (S106).

Figure 22:
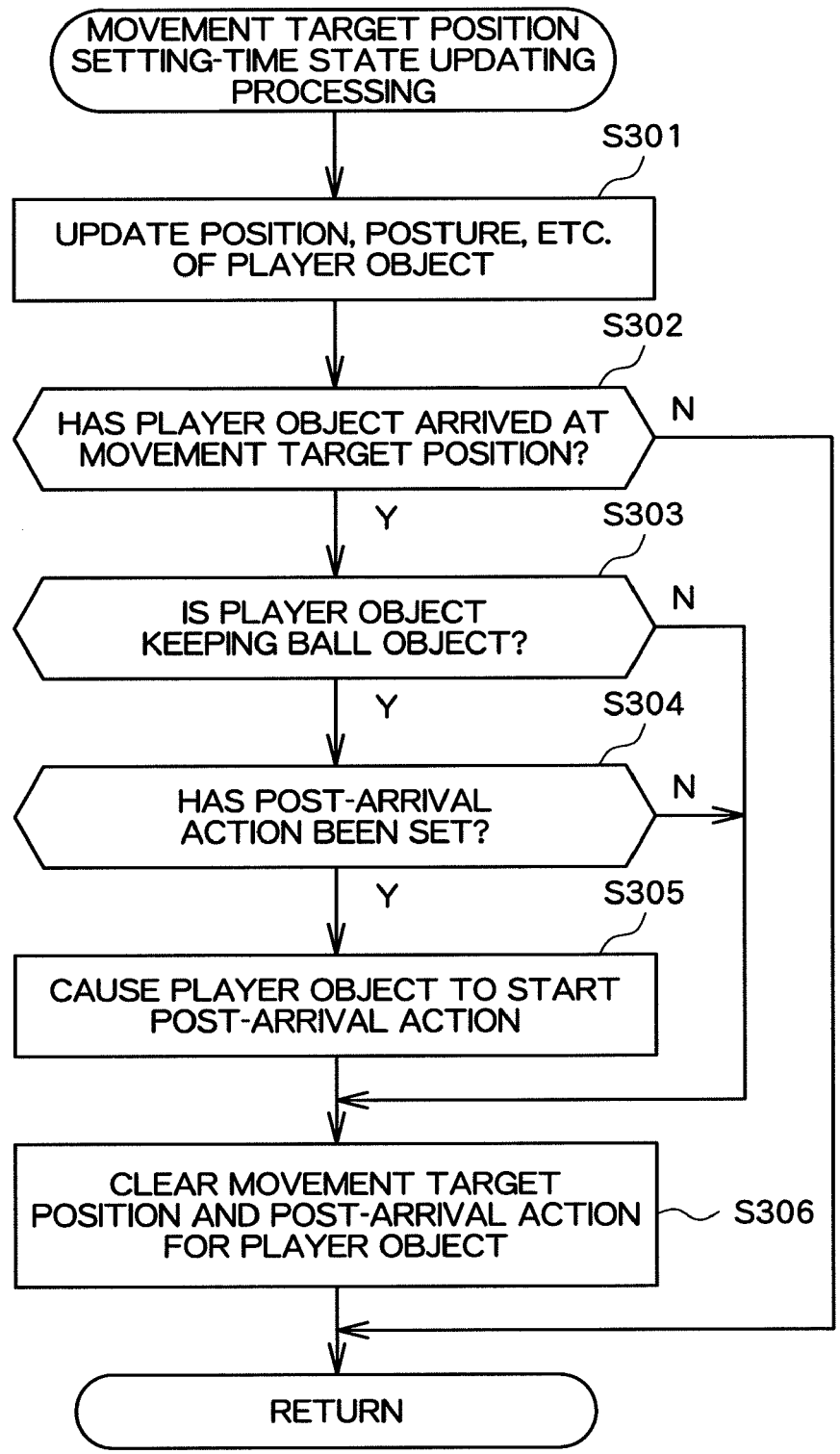
FIG. 22 is a flowchart illustrating the processing executed on the game device.

Herein, the processing of Step S107 (update processing for the game situation information) is described in more detail. Herein, in particular, description is given of updating of the information that indicates the state of the player object 58 for which the movement target position has been set. FIG. 22 is a flowchart illustrating the processing (movement target position setting-time state updating processing) for updating the information that indicates the state of the player object 58 for which the movement target position has been set.

As illustrated in FIG. 22, the game device 10 updates the state (such as position and posture) of the player object 58 (S301). For example, the game device 10 updates the position indicated by the "position" field of the player object information table corresponding to the player object 58 to a position obtained by moving the current position along the moving direction (direction from the current position toward the movement target position) by a distance (distance that can be moved in $1/60^{th}$ of a second) according to the moving speed. Further, for example, the game device 10 updates the "motion data reproducing position" field of the player object information table corresponding to the player object 58.

Subsequently, the game device 10 judges whether or not the player object 58 has arrived at the movement target position (S302). If the player object 58 has arrived at the movement target position, the game device 10 judges whether or not the player object 58 is keeping the ball object 60 (S303). If the player object 58 is keeping the ball object 60, the game device 10 judges whether or not the post-arrival action has been set for the player object 58 (S304). If the post-arrival action has been set for the player object 58, the game device 10 causes the player object 58 to start the post-arrival action (S305). That is, the game device 10 sets an ID of the motion data on the post-arrival action set for the player object 58, in the "motion data during reproduction" field of the player object information table corresponding to the player object 58, and sets the value that indicates the initial position in the "motion data reproducing position" field thereof. Further, after causing the player object 58 to start the post-arrival action, the game device 10 clears the "movement target position" and "post-arrival action" fields of the player object information table corresponding to the player object 58 (S306). In this case, the player object 58 enters a state where the movement target position or the post-arrival action is not set.

According to the game device 10 described above, by providing the game device 10 with the outside-screen movement target position setting function, the user becomes able to set a position in the vicinity of the corner area 57 or the goal object 53 within the opponent's field as the movement target position for the player object 58 even if the vicinity thereof is not being displayed on the game screen 18a.

Incidentally, even in the case where the vicinity of the corner area 57 or the goal object 53 within the opponent's field is not being displayed on the game screen 18a, in order to allow the user to set a position in the vicinity thereof as the movement target position for the player object 58, for example, there is a possible method in which the virtual camera 62 itself is moved according to the designation position of the controller 32 if the controller 32 is directed toward the outside of the game screen 18a. Accordingly, the user becomes able to cause the vicinity of the corner area 57 or the goal object 53 within the opponent's field to be displayed on the game screen 18a, and hence the user becomes able to set a position in the vicinity thereof as the movement target position for the player object 58. However, for example, in a case where a plurality of users play the game by watching one monitor 18 (game screen 18a), it is not appropriate for one user to move the virtual camera 62 at their convenience, and hence the above-mentioned method cannot be employed. In this respect, the method according to this embodiment, in which the virtual camera 62 never moves at one user's convenience, can also be employed in the case where the plurality of users play the game by watching one monitor 18 (game screen 18a).

Note that the present invention is not limited to the embodiment described above.

For example, the present invention can also be employed in the case of designating a action target position other than the movement target position for the player object 58. For example, the present invention can also be employed in the case of enabling the position on the field object 52 outside the display subject region to the designated as a kick target position for the player object 58.

Further, for example, the present invention can be employed by the game device 10 executing a game other than the soccer game.

Figure 23:
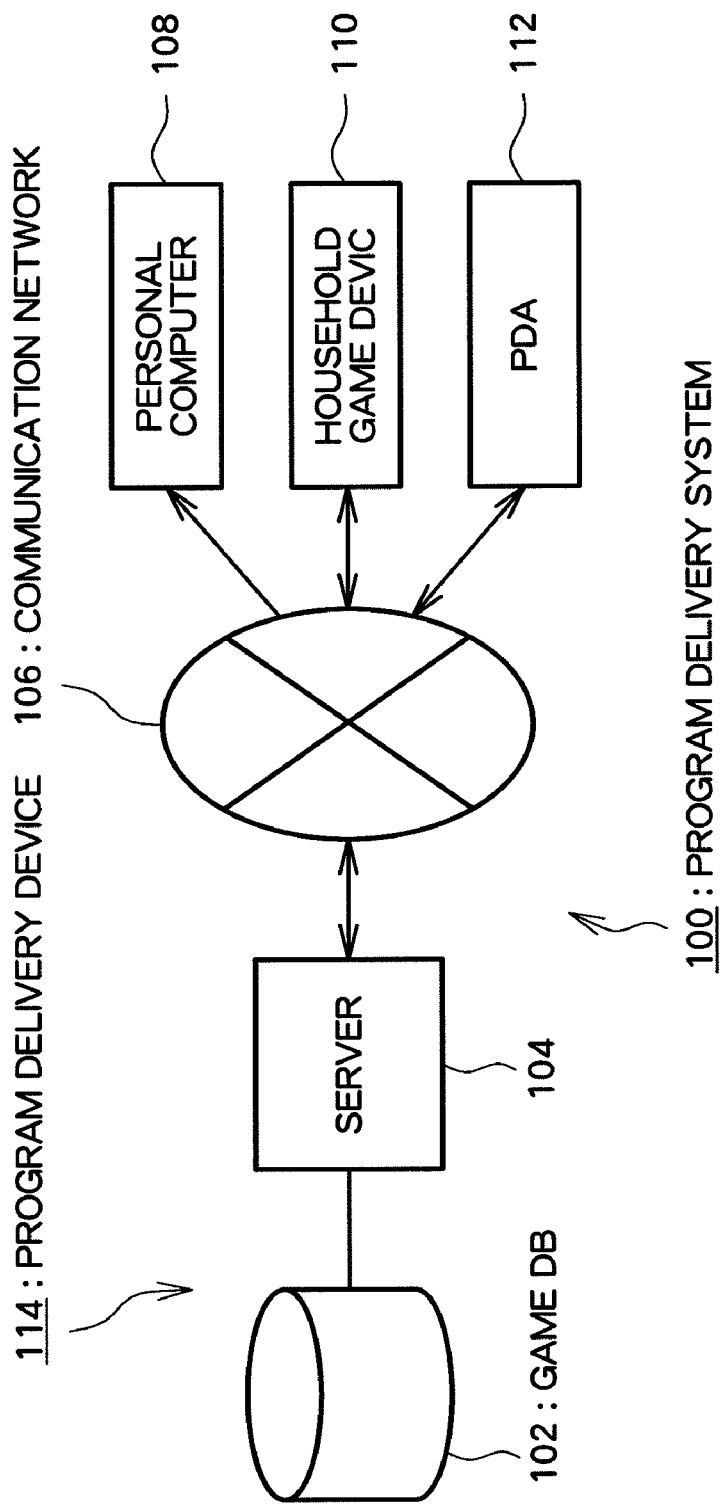
FIG. 23 is a diagram illustrating an overall configuration of a program delivery system according to another embodiment of the present invention.

Further, for example, in the above-mentioned description, the program is supplied from the optical disk 25 serving as an information recording medium to the home-use game device 11, but the program may be delivered to a household or the like via a communication network. FIG. 23 is a diagram illustrating an overall configuration of a program delivery system using the communication network. Based on FIG. 23, description is given of a program delivery method according to the present invention. As illustrated in FIG. 23, the program delivery system 100 includes a game database 102, a server 104, a communication network 106, a personal computer 108, a home-use game device 110, and a personal digital assistant (PDA) 112. Of those, the game database 102 and the server 104 constitute a program delivery device 114. The communication network 106 includes, for example, the Internet and a cable television network. In this system, the same program as storage contents of the optical disk 25 is stored in the game database (information recording medium) 102. A demander uses the personal computer 108, the home-use game device 110, or the PDA 112 to make a game delivery request, and hence the game delivery request is transferred to the server 104 via the communication network 106. Then, the server 104 reads the program from the game database 102 according to the game delivery request, and transmits the game delivery request to a game delivery request source such as the personal computer 108, the home-use game device 110, and the PDA 112. Here, the game delivery is performed according to the game delivery request, but the server 104 may transmit the program one way. In addition, all of programs necessary to implement the game are not necessarily delivered at one time (delivered collectively), and necessary parts may be delivered (split and delivered) depending on which phase the game is in. By thus performing the game delivery via the communication network 106, the demander can obtain the program with ease.

The invention claimed is:

1. A game device, which displays on a game screen a state of a display subject region within a game space in which a game character is located, the game device comprising:
   a screen coordinate value acquisition unit that acquires a screen coordinate value according to a user's operation;
   a judgment unit that determines whether or not the screen coordinate value is a screen coordinate value within the game screen;
   a first action target position acquisition unit that, if it is determined that the screen coordinate value is a screen coordinate value within the game screen, acquires a position within the display subject region corresponding to the screen coordinate value as an action target position of a predetermined action for the game character;
   a second action target position acquisition unit that, if it is determined that the screen coordinate value is not a screen coordinate value within the game screen, acquires a position outside the display subject region as an action target position of the predetermined action for the game character based on the screen coordinate value; and
   a game character action control unit that performs action control on the game character based on the action target position,
   wherein the second action target position acquisition unit:
   determines whether or not a screen coordinate value condition related to the screen coordinate value, stored in associated with each of a plurality of action target position candidates set outside the display subject region, is satisfied by the screen coordinate value; and
   acquires an action target position candidate associated with the screen coordinate value condition satisfied by the screen coordinate value, as the action target position of the predetermined action for the game character, wherein the display subject region corresponds to a portion of the game space that is displayed on the game screen, and the position outside the display subject region is not displayed on the game screen.

2. A game device according to claim 1, wherein the screen coordinate value condition is a condition related to a direction from a position of the game character within the game space toward a position within the game space corresponding to the screen coordinate value acquired by the screen coordinate value acquisition unit.

3. A game device, which displays on a game screen a state of a display subject region within a game space in which a game character is located, the game device comprising:

a screen coordinate value acquisition unit that acquires a screen coordinate value according to a user's operation;

a judgment unit that determines whether or not the screen coordinate value is a screen coordinate value within the game screen;

a first action target position acquisition unit that, if it is determined that the screen coordinate value is a screen coordinate value within the game screen, acquires a position within the display subject region corresponding to the screen coordinate value as an action target position of a predetermined action for the game character;

a second action target position acquisition unit that, if it is determined that the screen coordinate value is not a screen coordinate value within the game screen, acquires a position outside the display subject region as an action target position of the predetermined action for the game character based on the screen coordinate value; and a game character action control unit that performs action control on the game character based on the action target position acquired by the first or second action target position acquisition units, wherein the second action target position acquisition unit:

determines whether or not a screen coordinate value condition related to the screen coordinate value, stored in associated with each of a plurality of action target position candidates set outside the display subject region, is satisfied by the screen coordinate value; and acquires an action target position candidate associated with the screen coordinate value condition satisfied by the screen coordinate value, as the action target position of the predetermined action for the game character, wherein:

the second action target position acquisition unit:

displays, if it is determined that the screen coordinate value is not a screen coordinate value within the game screen, a predetermined icon image on the game screen; and determines whether or not a predetermined operation is performed by the user with the predetermined icon image being displayed on the game screen; and executes, if it is determined that the predetermined operation is performed, the acquiring of the action target position of the predetermined action for the game character.

4. A game device according to claim 1, wherein:

the action target position of the predetermined action for the game character is a movement target position for the game character; and the game character action control unit:

moves the game character toward the movement target position;

monitors whether or not the game character has arrived at the movement target position; and acquires a position of the game character within the game space at a time when the action target position is acquired, and acquires, based on a storage that stores post-arrival action information related to an action after the game character has arrived at the movement target position in association with a position condition related to a position within the game space, the post-arrival action information associated with the position condition satisfied by the position; and performs action control on the game character based on the post-arrival action information after the game character has arrived at the movement target position.

5. A control method for a game device which displays on a game screen a state of a display subject region within a game space in which a game character is located, the control method comprising:

acquiring a screen coordinate value according to a user's operation;

determining whether or not the screen coordinate value is a screen coordinate value within the game screen;

acquiring, if it is determined that the screen coordinate value is a screen coordinate value within the game screen, a position within the display subject region corresponding to the screen coordinate value as an action target position of a predetermined action for the game character;

acquiring, if it is determined that the screen coordinate value is not a screen coordinate value within the game screen, a position outside the display subject region as the action target position of the predetermined action for the game character based on the screen coordinate value; and performing action control on the game character based on the action target position, wherein acquiring the position outside the display subject region comprises:

determining whether or not a screen coordinate value condition related to the screen coordinate value, stored in association with each of a plurality of action target position candidates set outside the display subject region, is satisfied by the screen coordinate value; and acquiring an action target position candidate associated with the screen coordinate value condition satisfied by the screen coordinate value, as the action target position of the predetermined action for the game character, wherein the display subject region corresponds to a portion of the game space that is displayed on the game screen, and the position outside the display subject region is not displayed on the game screen.

6. A non-transitory computer-readable information recording medium recorded with a program for causing a computer to function as a game device which displays on a game screen a state of a display subject region within a game space in which a game character is located, the program further causing the computer to function as:

a screen coordinate value acquisition unit that acquires a screen coordinate value according to a user's operation;

judgment unit that determines whether or not the screen coordinate value is a screen coordinate value within the game screen;

a first action target position acquisition unit that, if it is determined that the screen coordinate value is a screen coordinate value within the game screen, acquires a position within the display subject region corresponding to the screen coordinate value as an action target position of a predetermined action for the game character;

a second action target position acquisition unit that, if it is determined that the screen coordinate value is not a screen coordinate value within the game screen, acquires a position outside the display subject region as the action target position of the predetermined action for the game character based on the screen coordinate value; and a game character action control unit that performs action control on the game character based on the action target position, wherein the second action target position acquisition unit:

determines whether or not a screen coordinate value condition related to the screen coordinate value, stored in associated with each of a plurality of action target position candidates set outside the display subject region, is satisfied by the screen coordinate value; and acquires an action target position candidate associated with the screen coordinate value condition satisfied by the screen coordinate value, as the action target position of the predetermined action for the game character, wherein the display subject region corresponds to a portion of the game space that is displayed on the game screen, and the position outside the display subject region is not displayed on the game screen.

7. A game device according to claim 2, wherein:

the second action target position acquisition unit:

displays, if it is determined that the screen coordinate value is not a screen coordinate value within the game screen, a predetermined icon image on the game screen; and determines whether or not a predetermined operation is performed by the user with the predetermined icon image being displayed on the game screen; and executes, if it is determined that the predetermined operation is performed, the acquiring of the action target position of the predetermined action for the game character.

8. A game device according to claim 2, wherein:

the action target position of the predetermined action for the game character is a movement target position for the game character; and the game character action control unit:

moves the game character toward the movement target position;

monitors whether or not the game character has arrived at the movement target position;

acquires a position of the game character within the game space at a time when the action target position is acquired, and acquires, based on a storage that stores post-arrival action information related to an action after the game character has arrived at the movement target position in association with a position condition related to a position within the game space, the post-arrival action information associated with the position condition satisfied by the position; and performs action control on the game character based on the post-arrival action information after the game character has arrived at the movement target position.

9. A control method for a game device which displays on a game screen a state of a display subject region within a game space in which a game character is located, the control method comprising:

acquiring a screen coordinate value according to a user's operation;

determining whether or not the screen coordinate value is a screen coordinate value within the game screen;

acquiring, if it is determined that the screen coordinate value is a screen coordinate value within the game screen, a position within the display subject region corresponding to the screen coordinate value as an action target position of a predetermined action for the game character;

acquiring, if it is determined that the screen coordinate value is not a screen coordinate value within the game screen, a position outside the display subject region as an action target position of the predetermined action for the game character based on the screen coordinate value; and performing action control on the game character based on the action target position, wherein the acquiring the position outside the display subject region comprises:

determining whether or not a screen coordinate value condition related to the screen coordinate value, stored in associated with each of a plurality of action target position candidates set outside the display subject region, is satisfied by the screen coordinate value; and acquiring an action target position candidate associated with the screen coordinate value condition satisfied by the screen coordinate value, as the action target position of the predetermined action for the game character, wherein:

the acquiring the position outside the display subject region comprises:

displaying, if it is determined that the screen coordinate value is not a screen coordinate value within the game screen, a predetermined icon image on the game screen; and determining whether or not a predetermined operation is performed by the user with the predetermined icon image being displayed on the game screen; and executing, if it is determined that the predetermined operation is performed, the acquiring of the action target position of the predetermined action for the game character.

10. A non-transitory computer-readable information recording medium recorded with a program for causing a computer to function as a game device which displays on a game screen a state of a display subject region within a game space in which a game character is located, the program further causing the computer to function as:

a screen coordinate value acquisition unit that acquires a screen coordinate value according to a user's operation;

a judgment unit that determines whether or not the screen coordinate value is a screen coordinate value within the game screen;

a first action target position acquisition unit that, if it is determined that the screen coordinate value is a screen coordinate value within the game screen, acquires a position within the display subject region corresponding to the screen coordinate value as an action target position of a predetermined action for the game character;

a second action target position acquisition unit that, if it is determined that the screen coordinate value is not a screen coordinate value within the game screen, acquires a position outside the display subject region as an action target position of the predetermined action for the game character based on the screen coordinate value; and a game character action control unit that performs action control on the game character based on the action target position acquired by the first or second action target position acquisition units, wherein the second action target position acquisition unit:

determines whether or not a screen coordinate value condition related to the screen coordinate value, stored in associated with each of a plurality of action target position candidates set outside the display subject region, is satisfied by the screen coordinate value; and acquires an action target position candidate associated with the screen coordinate value condition satisfied by the screen coordinate value, as the action target position of the predetermined action for the game character, wherein:

the second action target position acquisition unit:

displays, if it is determined that the screen coordinate value is not a screen coordinate value within the game screen, a predetermined icon image on the game screen; and determines whether or not a predetermined operation is performed by the user with the predetermined icon image being displayed on the game screen; and executes, if it is determined that the predetermined operation is performed, the acquiring of the action target position of the predetermined action for the game character.

* * * * *